(12) United States Patent
Zhang et al.

(10) Patent No.: US 11,765,345 B2
(45) Date of Patent: Sep. 19, 2023

(54) MULTIPLE PREDICTION BLOCKS FOR ONE INTRA-CODED BLOCK

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/205,965

(22) Filed: Mar. 18, 2021

(65) Prior Publication Data

US 2021/0211709 A1    Jul. 8, 2021

Related U.S. Application Data

(63) Continuation of application No. PCT/IB2019/057904, filed on Sep. 19, 2019.

(30) Foreign Application Priority Data

Sep. 19, 2018    (WO) ............... PCT/CN2018/106518

(51) Int. Cl.
*H04N 19/513* (2014.01)
*H04N 19/11* (2014.01)
(Continued)

(52) U.S. Cl.
CPC ........... *H04N 19/11* (2014.11); *H04N 19/105* (2014.11); *H04N 19/129* (2014.11);
(Continued)

(58) Field of Classification Search
CPC ............. H01L 27/3216; H01L 27/3218; H01L 27/3246; H01L 51/5012; H01L 51/5206;
(Continued)

(56) References Cited

U.S. PATENT DOCUMENTS 9,154,796 B2   10/2015   Seregin et al.
9,591,325 B2    3/2017   Li et al.
(Continued)

FOREIGN PATENT DOCUMENTS

CN         1674680 A     9/2005
CN       102860006 A     1/2013
(Continued)

OTHER PUBLICATIONS

Chen et al. "Algorithm Description of Joint Exploration Test Model 6 (JEM 6)," Joint Video Exploration Team (JVET) of ITU-T SG 16 WP 3 and ISO/IEC JTC 1/SC 29/WG 11, 6th Meeting, Hobart, AU, Mar. 31-Apr. 7, 2017, document JVET-F1001, 2017.
(Continued)

*Primary Examiner* — Md N Haque
(74) *Attorney, Agent, or Firm* — Perkins Coie LLP

(57) ABSTRACT

Devices, systems and methods for digital video processing, which includes multiple prediction blocks for one intra-coded block, are described. In a representative aspect, a method for video processing includes generating a final prediction block for a conversion between a current block of visual media data and a bitstream representation of the current block and performing the conversion based on the final prediction block. At least a portion of the final prediction block is generated based on a combination of a first prediction block and a second prediction block that are based on reconstructed samples from an image segment that comprises the current block.

20 Claims, 23 Drawing Sheets

US 11,765,345 B2

Page 2

(51) Int. Cl.
| | |
|---|---|
| H04N 19/105 | (2014.01) |
| H04N 19/129 | (2014.01) |
| H04N 19/159 | (2014.01) |
| H04N 19/176 | (2014.01) |
| H04N 19/186 | (2014.01) |
| H04N 19/132 | (2014.01) |
| H04N 19/82 | (2014.01) |

(52) U.S. Cl.
CPC ......... *H04N 19/132* (2014.11); *H04N 19/159* (2014.11); *H04N 19/176* (2014.11); *H04N 19/186* (2014.11); *H04N 19/513* (2014.11); *H04N 19/82* (2014.11)

(58) Field of Classification Search
CPC ............ H01L 51/5225; H01L 51/5209; H04N 19/105; H04N 19/11; H04N 19/129; H04N 19/132; H04N 19/136; H04N 19/159; H04N 19/176; H04N 19/186; H04N 19/513; H04N 19/52; H04N 19/593; H04N 19/82
See application file for complete search history.

(56) References Cited

U.S. PATENT DOCUMENTS

| | | | |
|---|---|---|---|
| 9,699,457 B2 | 7/2017 | Guo et al. | |
| 9,877,043 B2 | 1/2018 | He et al. | |
| 9,883,197 B2 | 1/2018 | Chen et al. | |
| 9,918,105 B2* | 3/2018 | Pang | H04N 19/593 |
| 10,212,435 B2 | 2/2019 | Ramasubramonian et al. | |
| 10,244,242 B2 | 3/2019 | Wang et al. | |
| 10,284,874 B2 | 5/2019 | He et al. | |
| 10,368,091 B2 | 7/2019 | Li et al. | |
| 10,368,092 B2 | 7/2019 | Li et al. | |
| 10,412,387 B2* | 9/2019 | Pang | H04N 19/159 |
| 10,469,863 B2 | 11/2019 | Zhu et al. | |
| 10,582,213 B2 | 3/2020 | Li et al. | |
| 10,812,817 B2 | 10/2020 | Li et al. | |
| 11,503,284 B2 | 11/2022 | Zhang et al. | |
| 2008/0240245 A1* | 10/2008 | Lee | H04N 19/147 |
| | | | 375/240.16 |
| 2011/0194609 A1 | 8/2011 | Rusert et al. | |
| 2013/0301944 A1 | 11/2013 | Kim et al. | |
| 2014/0226912 A1 | 8/2014 | Lee et al. | |
| 2015/0350682 A1 | 12/2015 | Zhang et al. | |
| 2016/0080751 A1 | 3/2016 | Xiu et al. | |
| 2016/0182905 A1 | 6/2016 | Lee et al. | |
| 2016/0227214 A1* | 8/2016 | Rapaka | H04N 19/593 |
| 2016/0241858 A1 | 8/2016 | Li et al. | |
| 2016/0316201 A1 | 10/2016 | Lee et al. | |
| 2016/0330471 A1* | 11/2016 | Zhu | H04N 19/52 |
| 2017/0332084 A1 | 11/2017 | Seregin et al. | |
| 2018/0063553 A1 | 3/2018 | Zhang et al. | |
| 2018/0199061 A1 | 7/2018 | Zhang et al. | |
| 2018/0213261 A1* | 7/2018 | Ikonin | G06T 5/003 |
| 2019/0141318 A1 | 5/2019 | Li et al. | |
| 2019/0141319 A1 | 5/2019 | Moon et al. | |
| 2019/0166370 A1 | 5/2019 | Xu et al. | |
| 2019/0200038 A1 | 6/2019 | He et al. | |
| 2019/0208201 A1 | 7/2019 | Yasugi et al. | |
| 2019/0238842 A1 | 8/2019 | Ryu et al. | |
| 2019/0238864 A1 | 8/2019 | Xiu et al. | |
| 2019/0327466 A1 | 10/2019 | Ikai et al. | |
| 2020/0092544 A1 | 3/2020 | Zhao et al. | |
| 2020/0092579 A1 | 3/2020 | Zhu et al. | |
| 2020/0177910 A1 | 6/2020 | Li et al. | |
| 2020/0195960 A1 | 6/2020 | Zhang et al. | |
| 2020/0244956 A1 | 7/2020 | Lee et al. | |
| 2020/0275124 A1 | 8/2020 | Ko et al. | |
| 2020/0296417 A1 | 9/2020 | Ko et al. | |
| 2020/0413069 A1 | 12/2020 | Lim et al. | |
| 2021/0021811 A1 | 1/2021 | Xu et al. | |
| 2021/0211654 A1 | 7/2021 | Zhang et al. | |
| 2021/0211655 A1 | 7/2021 | Zhang et al. | |
| 2021/0281838 A1 | 9/2021 | Lee et al. | |
| 2021/0352321 A1 | 11/2021 | Heo et al. | |
| 2022/0030228 A1 | 1/2022 | Ma et al. | |

FOREIGN PATENT DOCUMENTS

| | | |
|---|---|---|
| CN | 103959789 A | 7/2014 |
| CN | 105917650 A | 8/2016 |
| CN | 106131548 A | 11/2016 |
| CN | 107079161 A | 8/2017 |
| CN | 107454403 A | 12/2017 |
| EP | 2770739 A1 | 8/2014 |
| EP | 3253061 A1 | 12/2017 |
| KR | 20170058837 A | 5/2017 |
| WO | 2015052273 A1 | 4/2015 |
| WO | 2018037896 A1 | 3/2018 |
| WO | 2018116925 A1 | 6/2018 |

OTHER PUBLICATIONS

Conti et al. "HEVC-Based Light Field Image Coding with Bi-Predicted Self-Similarity Compensation," 2016 IEEE International Conference on Multimedia & Expo Workshops (ICMEW), IEEE, Jul. 11, 2016, pp. 1-4.

Gao et al. "Non-CE8: IBC Merge List Simplification," Joint Video Experts Team (JVET) of ITU-T SG 16 WP3 and ISO/EC JTC 1/SC 29/WG 11, 14th Meeting, Geneva, CH, Mar. 19-27, 2019, document JVET-N0176, 2019.

Han et al. "CE8-Related: Simplification on IBC Merge/Skip Mode," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0317, 2019.

Kotra et al. "CE3 3.2.2: Intra Mode Signaling with Priority Based MPM and Non-MPM List Construction," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0365, 2018.

Lee et al. "AHG5: Block Size Restriction on Intra Block Copy," Joint Collaborative Team on Video Coding (JCT-VC) of ITU-T SG WP 3 and ISO/IEC JTC 1/SC 29/WG 11, 15th Meeting, Geneva, CH, Oct. 23-Nov. 1, 2013, document JCTVC-O0102, 2013.

Liu et al. "On Operation of DPB in Screen Content Coding," Joint Collaborative Team on Video Coding (JCT-VC) of ITU-T SG 16 WP 3 and ISO/IEC JTC 1/SC 29/WG 11, 21st Meeting, Warsaw, PL, Jun. 19-26, 2015, document JCTVC-U0100, 2015.

Liu et al. "Hybrid Linear Weighted Prediction and Intra Block Copy Based Light Field Image Coding," Multimedia Tools and Applications, Kluwer Academic Publishers, Boston, US, Jun. 14, 2018, 77(24):31929-31951.

Seregin et al. "Block Shape Dependent Intra Mode Coding," Joint Video Exploration Team (JVET) of ITU-T SG 16 WP 3 and ISO/IEC JTC 1/SC 29/WG 11 4th Meeting, Chengdu, CN, Oct. 15-21, 2016, document JVET-D0114, 2016.

Thygesen, Signe Sidwall. "Weighted Combination of Sample Based and Block Based Intra Prediction in Video Coding," Master's Thesis, Apr. 12, 2016, Lund University, retrieved from the internet: URL:http://lup.lub.lu.se/student-papers/record/8626513/file/8626514.pdf (retrieved on Oct. 25, 2019).

Xu et al. "CE8-Related: Unified Intra Block Copy Block Vector Prediction," Joint Video Experts Team (JVET) of ITU-T SG 16 WP 3 and ISO/IEC JTC 1/Sc 29/WG 11, 14th Meeting, Geneva, CH, Mar. 19-27, 2019, document JVET-N0382, 2019.

Zhang et al. "Multiple Direct Modes for Chroma Intra Coding," Joint Video Exploration Team (JVET) of ITU-T SG 16 WP 3 and ISO/IEC JTC 1/SC 29/WG 11, 4th Meeting, Chengdu, CN, Oct. 15-21, 2016, document JVET-D0111, 2016.

Zhang et al. "Non-CE3: History-based Intra Most Probable Modes Derivation," Joint Video Experts Team (JVET) of ITU-T SG 16 WP 3 and ISO/IEC JTC 1/SC 29/WG 11 13th Meeting, Marrakech, MA, Jan. 9-18, 2019, document JVET-M0139, 2019.

(56) References Cited

OTHER PUBLICATIONS

International Search Report and Written Opinion from International Patent Application No. PCT/IB2019/057903 dated Jan. 2, 2020 (26 pages).
International Search Report and Written Opinion from International Patent Application No. PCT/IB2019/057904 dated Nov. 12, 2019 (16 pages).
International Search Report and Written Opinion from International Patent Application No. PCT/IB2019/057905 dated Nov. 15, 2019 (16 pages).
International Search Report and Written Opinion from International Patent Application No. PCT/IB2019/057906 dated Jan. 2, 2020 (23 pages).
International Search Report and Written Opinion from International Patent Application No. PCT/IB2019/058066 dated Mar. 3, 2020 (22 pages).
Non-Final Office Action from U.S. Appl. No. 17/205,865 dated Oct. 28, 2021.
Non-Final Office Action from U.S. Appl. No. 17/205,925 dated Dec. 21, 2021.
Final Office Action from U.S. Appl. No. 17/205,865 dated Mar. 15, 2022.
Final Office Action from U.S. Appl. No. 17/205,925 dated Jun. 16, 2022.
Non-Final Office Action from U.S. Appl. No. 17/205,925 dated Oct. 28, 2022.

\* cited by examiner

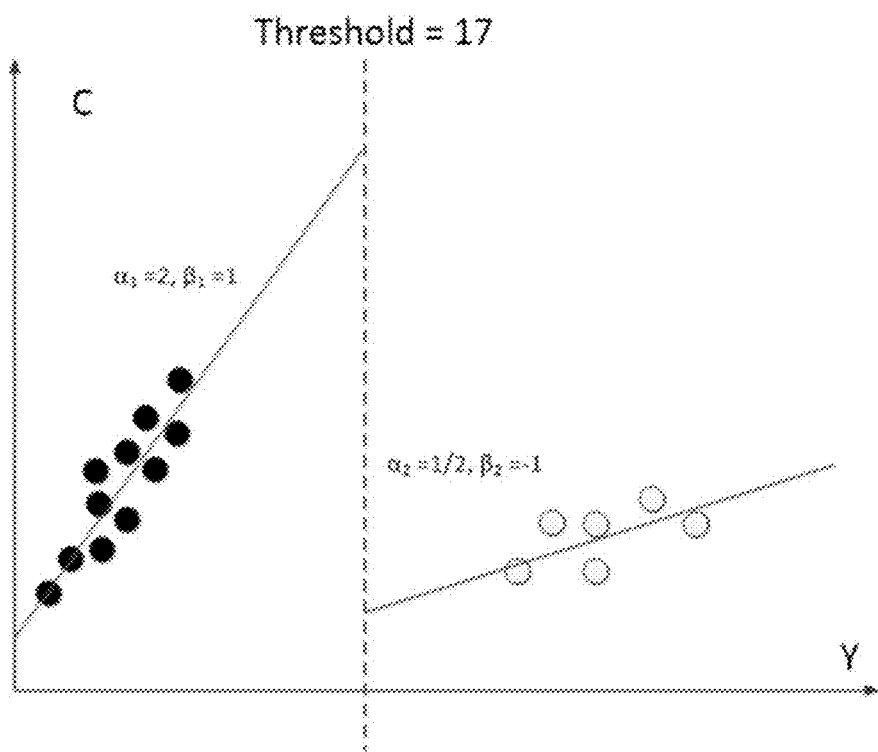
FIG. 7
 
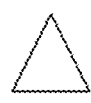
 
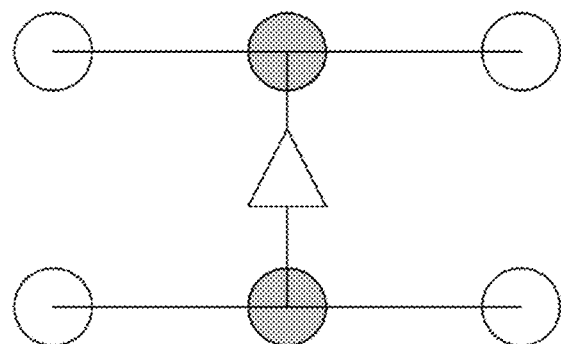
FIG. 8A          FIG. 8B FIG. 12
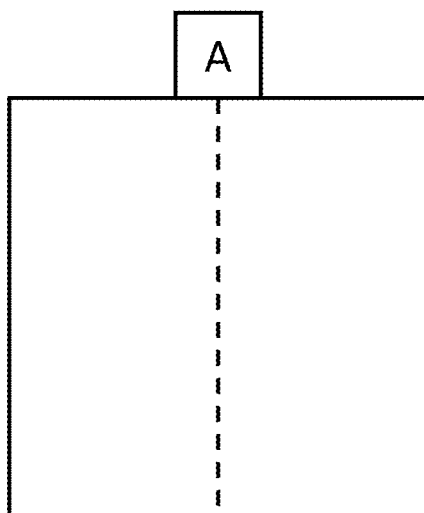
FIG. 13A
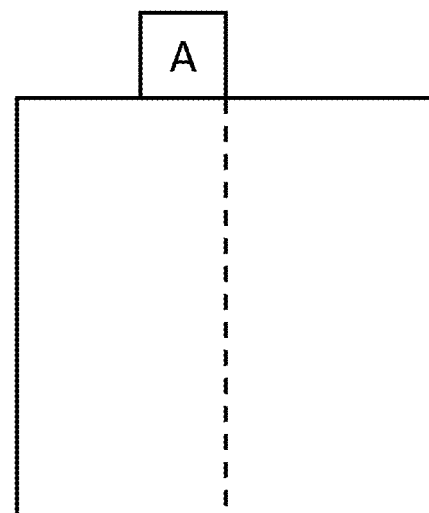
FIG. 13B

MULTIPLE PREDICTION BLOCKS FOR ONE INTRA-CODED BLOCK

CROSS REFERENCE TO RELATED APPLICATIONS

This application is a continuation of International Application No. PCT/IB2019/057904, filed on Sep. 19, 2019, which claims the priority to and benefit of International Patent Application No. PCT/CN2018/106518, filed on Sep. 19, 2018. All the aforementioned patent applications are hereby incorporated by reference in their entireties.

TECHNICAL FIELD

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, intra mode coding for images and video based of past (e.g., historical or statistical) information are described. The described methods may be applied to both the existing video coding standards (e.g., High Efficiency Video Coding (HEVC)) and future video coding standards (e.g., Versatile Video Coding (VVC)) or codecs.

In one representative aspect, the disclosed technology may be used to provide a method for video processing. This example method includes selecting, for a conversion between a current block of visual media data and a bitstream representation of the current block, a first intra prediction mode based on at least a first set of history intra coding information that includes statistical information of a set of intra prediction modes, and performing the conversion based on the first intra prediction mode.

In another representative aspect, the disclosed technology may be used to provide a method for video processing. This example method includes, selecting, for a conversion between a current block of visual media data and a bitstream representation of the current block, a first intra prediction mode based on at least intra prediction modes associated with non-adjacent neighbors of the current block. The method also includes performing the conversion based on the first intra prediction mode.

In another representative aspect, the disclosed technology may be used to provide a method for video processing. This example method includes, selecting, for a conversion between a current block of visual media data and a bitstream representation of the current block, an intra prediction mode based on at least one of spatial neighboring blocks to the current block, and performing the conversion based on the intra prediction mode. The at least one of the spatial neighboring blocks is different from a first block that is located to a left of a first row of the current block and a second block that is located above a first column of the current block.

In another representative aspect, the disclosed technology may be used to provide a method for video processing. This example method includes generating a final prediction block for a conversion between a current block of visual media data and a bitstream representation of the current block and performing the conversion based on the final prediction block. At least a portion of the final prediction block is generated based on a combination of a first prediction block and a second prediction block that are based on reconstructed samples from an image segment that comprises the current block.

In another representative aspect, the disclosed technology may be used to provide a method for video processing. This example method includes maintaining a first table of motion candidates during a conversion between a current block of visual media data and a bitstream representation of the current block and determining, based on at least the first table of motion candidates, motion information for the current block that is coded using an intra block copy (IBC) mode in which at least one motion vector is directed at an image segment that comprises the current block. The method also includes performing the conversion based on the motion information.

In another representative aspect, the disclosed technology may be used to provide a method for video coding. This example method for video coding includes selecting, for a bitstream representation of a current block of visual media data, a first intra prediction mode from a set of intra prediction modes based on a first set of past intra coding information, and processing, based on the first intra prediction mode, the bitstream representation to generate the current block.

In another representative aspect, the disclosed technology may be used to provide a method for video coding. This example method for video coding includes selecting, for a bitstream representation of a current block of visual media data, an intra prediction mode from at least one of adjacent or non-adjacent spatial neighboring blocks to the current block, and processing, based on the intra prediction mode, the bitstream representation to generate the current block.

In yet another representative aspect, the disclosed technology may be used to provide a method for video coding. This example method for video coding includes generating, for a bitstream representation of a current block of visual media data, a first prediction block and a second prediction block that are based on reconstructed samples from an image segment that comprises the current block, generating at least a portion of a final prediction block based on a linear function of the first and second prediction blocks, and processing, based on the final prediction block, the bitstream representation to generate the current block.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIG. 7 shows an example of classifying neighboring samples into two groups.

FIG. 8A shows an example of a chroma sample and its corresponding luma samples.

FIG. 8B shows an example of down filtering for the cross-component linear model (CCLM) in the Joint Exploration Model (JEM).

FIG. 12 shows an example of an intra-picture block copy.

FIGS. 13A-13F show examples of different adjacent blocks that may be selected for intra mode coding.

DETAILED DESCRIPTION

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding (VVC) standard to be finalized, or other current and/or future video coding standards.

Embodiments of the disclosed technology may be applied to existing video coding standards (e.g., HEVC, H.265) and future standards to improve runtime performance. Section headings are used in the present document to improve readability of the description and do not in any way limit the discussion or the embodiments (and/or implementations) to the respective sections only.

1 Examples of Intra Prediction in VVC 1.1 Intra Mode Coding with 67 Intra Prediction Modes To capture the arbitrary edge directions presented in natural video, the number of directional intra modes is extended from 33, as used in HEVC, to 65. The additional directional modes are depicted as red dotted arrows in FIG. 1, and the planar and DC modes remain the same. These denser directional intra prediction modes apply for all block sizes and for both luma and chroma intra predictions.

Figure 1:
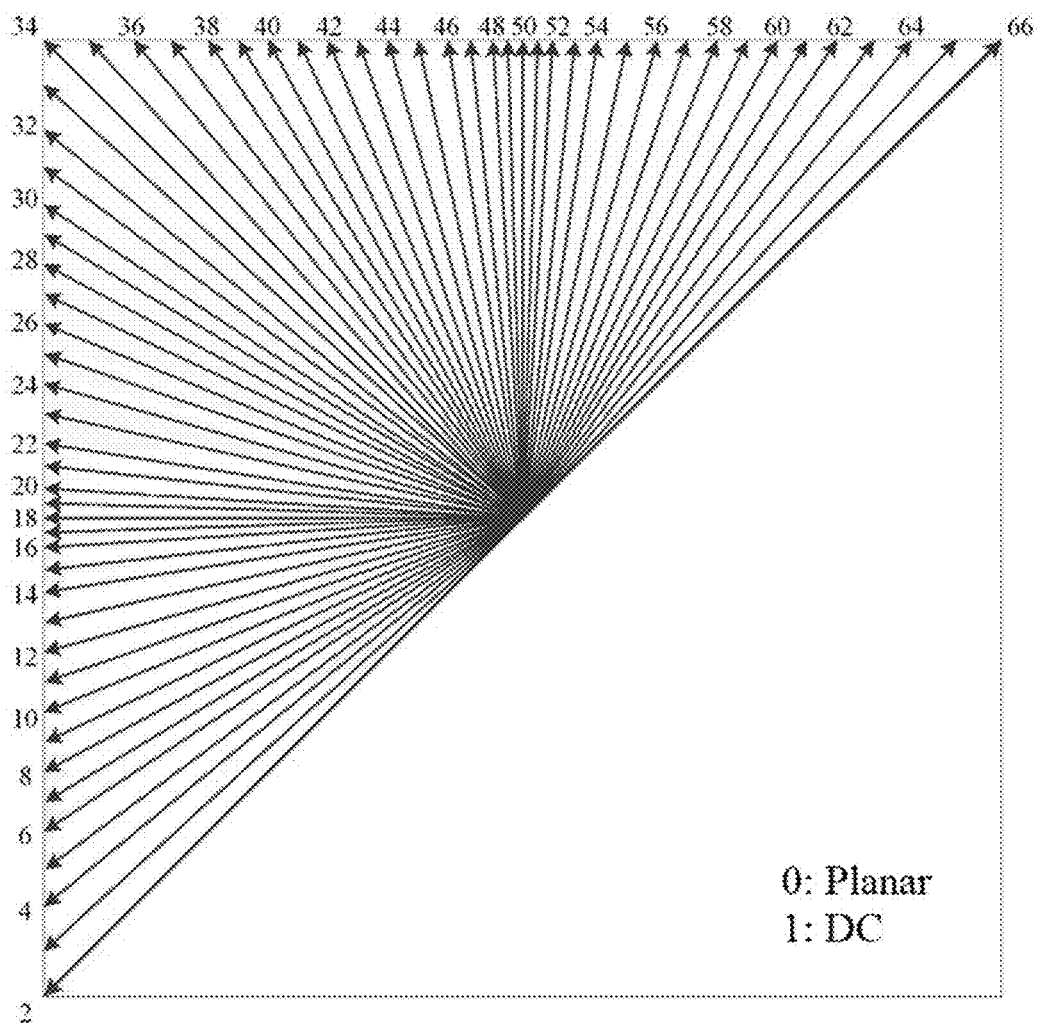
FIG. 1 shows an example of 67 intra prediction modes.

Conventional angular intra prediction directions are defined from 45 degrees to −135 degrees in clockwise direction as shown in FIG. 1. In VTM2, several conventional angular intra prediction modes are adaptively replaced with wide-angle intra prediction modes for the non-square blocks. The replaced modes are signaled using the original method and remapped to the indexes of wide angular modes after parsing. The total number of intra prediction modes is unchanged (e.g., 67), and the intra mode coding is unchanged.

In HEVC, every intra-coded block has a square shape and the length of each of its side is a power of 2. Thus, no division operations are required to generate an intra-predictor using DC mode. In VTV2, blocks can have a rectangular shape that necessitates the use of a division operation per block in the general case. To avoid division operations for DC prediction, only the longer side is used to compute the average for non-square blocks.

1.2 Examples of Intra Mode Coding

In some embodiments, and to keep the complexity of the MPM list generation low, an intra mode coding method with 3 Most Probable Modes (MPMs) is used. The following three aspects are considered to the MPM lists:

Neighbor intra modes;

Derived intra modes; and

Default intra modes.

Figure 2:
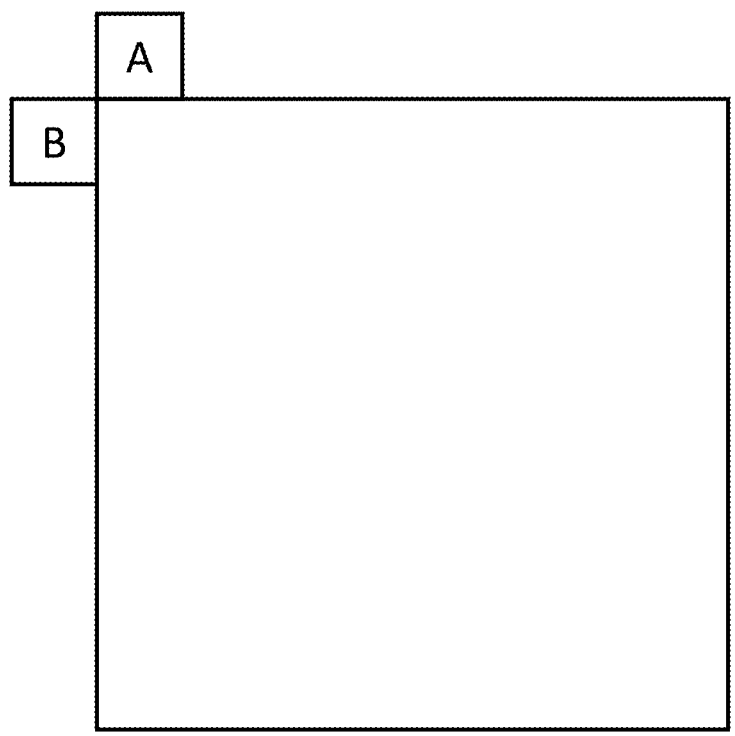
FIG. 2 shows an example of neighboring blocks used for intra mode prediction.

For neighbor intra modes (A and B), two neighbouring blocks, located in left and above are considered. The left and above blocks are those who are connected to the top-left sample of current block, as shown in FIG. 2. An initial MPM list is formed by performing pruning process for two neighboring intra modes. The pruning process is used to remove duplicated modes so that only unique modes can be included into the MPM list. If two neighboring modes are different each other, one of the default modes (e.g., PLANA (0), DC (1), ANGULAR50 (e.g., 50)) is added to the MPM list after the pruning check with the existing two MPMs. When the two neighboring modes are the same, either the default modes or the derived modes are added to the MPM list after the pruning check. The detailed generation process of three MPM list is derived as follows:

If two neighboring candidate modes (i.e., A==B) are same,
 If A is less than 2, candModeList [3]={0, 1, 50}.
 Otherwise, candModeList[0]={A, 2+((A+61) % 64), 2+((A−1) % 64)}
Otherwise,
 If neither of A and B is equal to 0, candModeList [3]={A, B, 0}.
 Otherwise, if neither of A and B is equal to 1, candModeList [3]={A, B, 1}.
 Otherwise, candModeList [3]={A, B, 50}.

An additional pruning process is used to remove duplicated modes so that only unique modes can be included into the MPM list. For entropy coding of the 64 non-MPM modes, a 6-bit Fixed Length Code (FLC) is used.

1.3 Wide-Angle Intra Prediction for Non-Square Blocks

In some embodiments, conventional angular intra prediction directions are defined from 45 degrees to −135 degrees in clockwise direction. In VTM2, several conventional angular intra prediction modes are adaptively replaced with wide-angle intra prediction modes for non-square blocks. The replaced modes are signaled using the original method and remapped to the indexes of wide angular modes after parsing. The total number of intra prediction modes for a certain block is unchanged, e.g., 67, and the intra mode coding is unchanged.

Figure 3A:
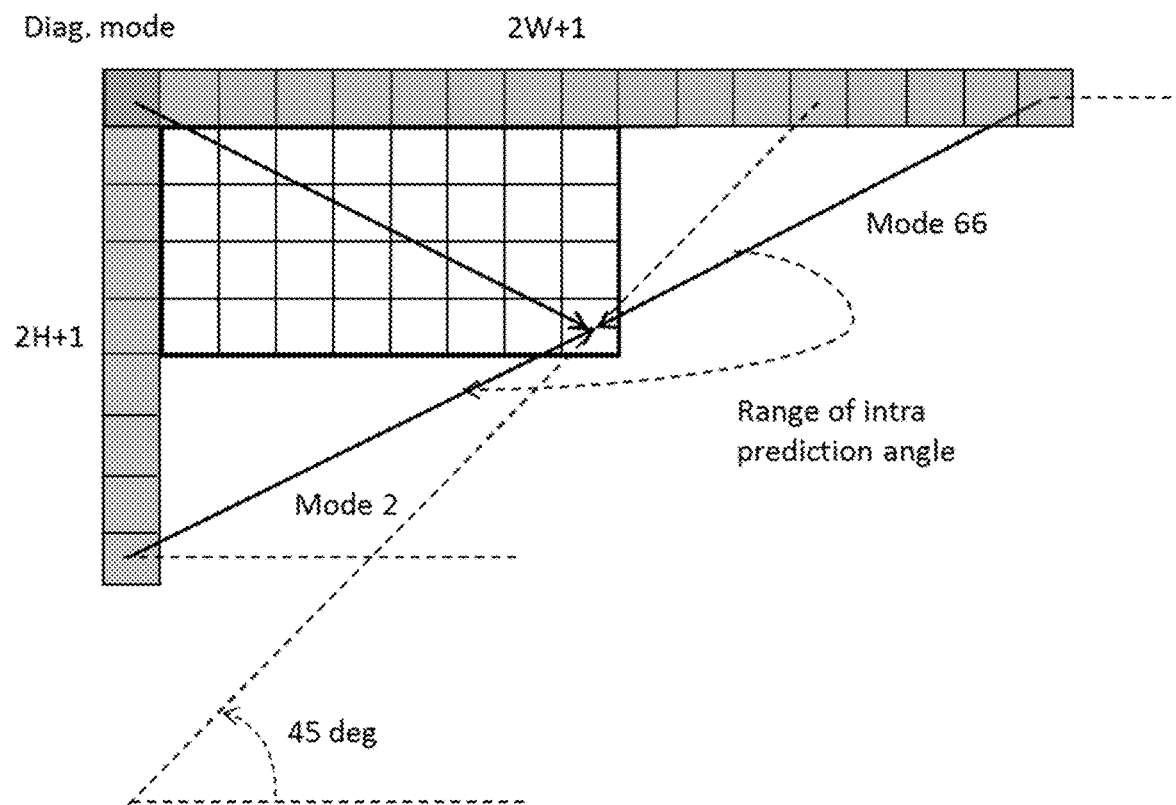
FIGS. 3A and 3B show examples of reference samples for wide-angle intra prediction modes for non-square blocks.
Figure 3B:
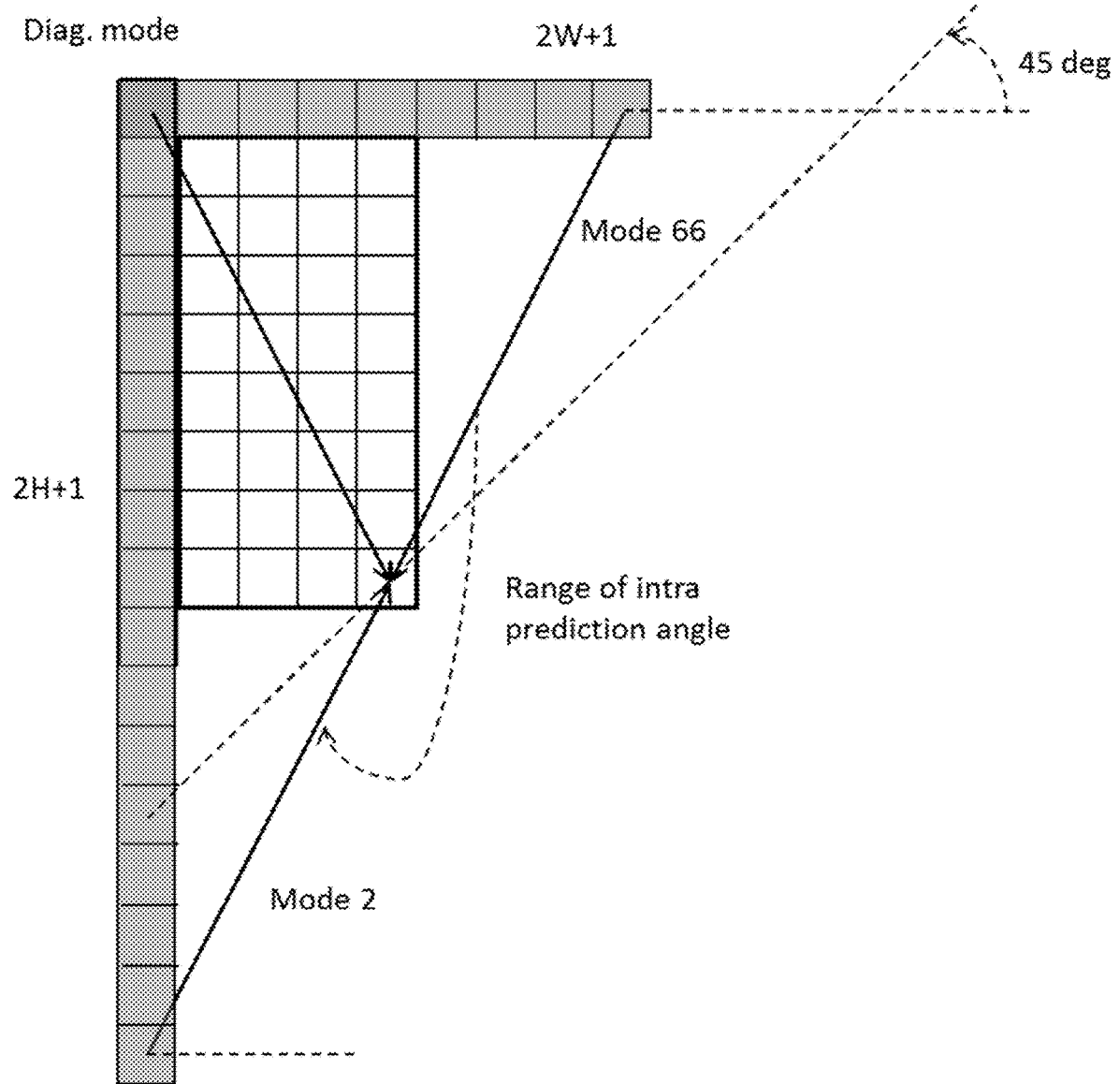

To support these prediction directions, the top reference with length 2 W+1, and the left reference with length 2H+1, are defined as shown in the examples in FIGS. 3A and 3B.

In some embodiments, the mode number of replaced mode in wide-angular direction mode is dependent on the aspect ratio of a block. The replaced intra prediction modes are illustrated in Table 1.

TABLE 1

Intra prediction modes replaced by wide-angle modes

| Condition | Replaced intra prediction modes |
|---|---|
| W/H = 2 | Modes 2, 3, 4, 5, 6, 7 |
| W/H > 2 | Modes 2, 3, 4, 5, 6, 7, 8, 9, 10, 11 |
| W/H = 1 | None |
| H/W = 1/2 | Modes 61, 62, 63, 64, 65, 66 |
| H/W < 1/2 | Mode 57, 58, 59, 60, 61, 62, 63, 64, 65, 66 |

Figure 4:
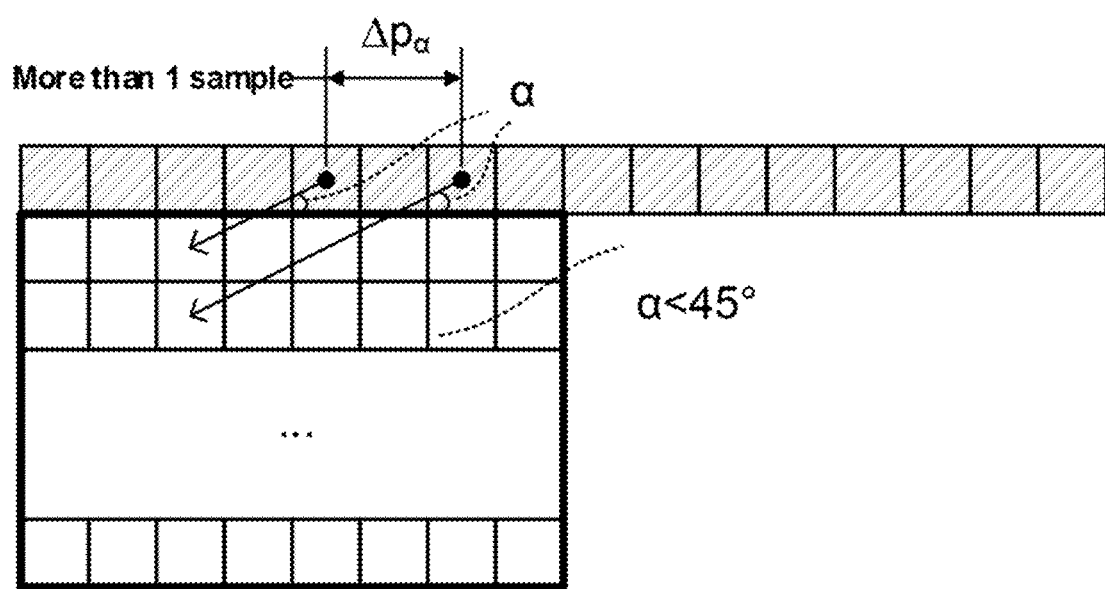
FIG. 4 shows an example of a discontinuity when using wide-angle intra prediction.
Figure 5A:
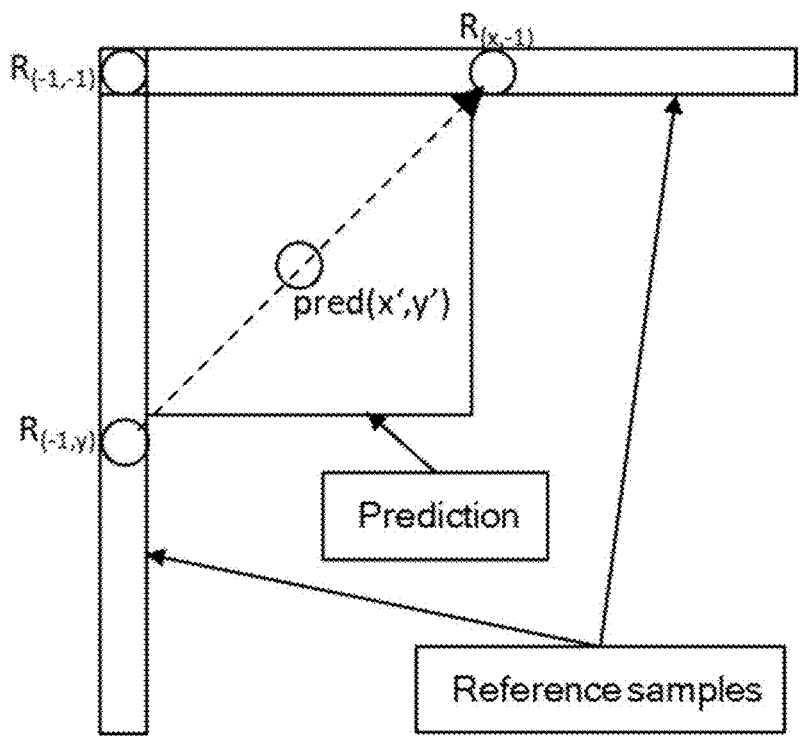
FIGS. 5A-5D show examples of samples used by a position-dependent intra prediction combination (PDPC) method.
Figure 5B:
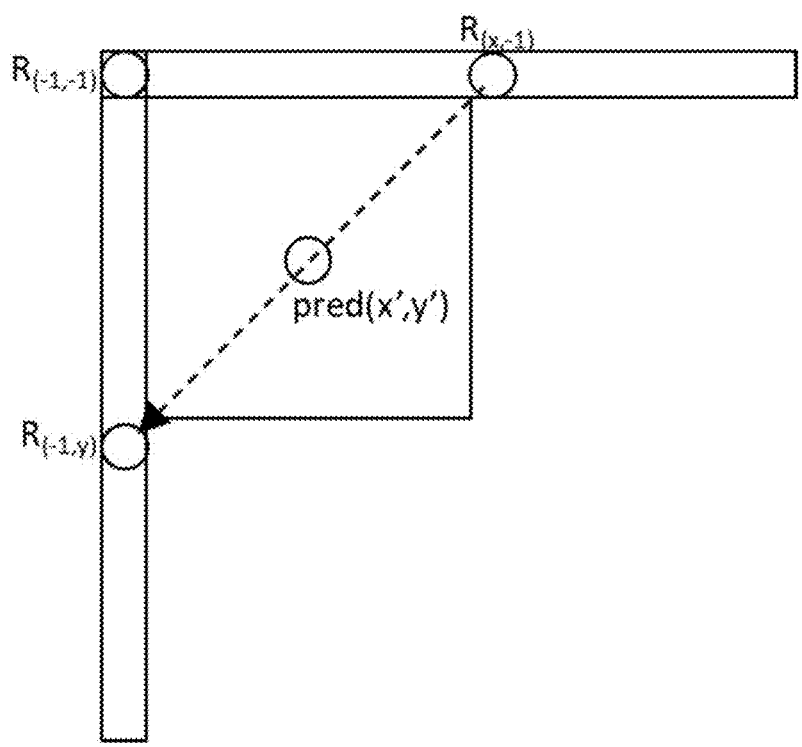
Figure 5C:
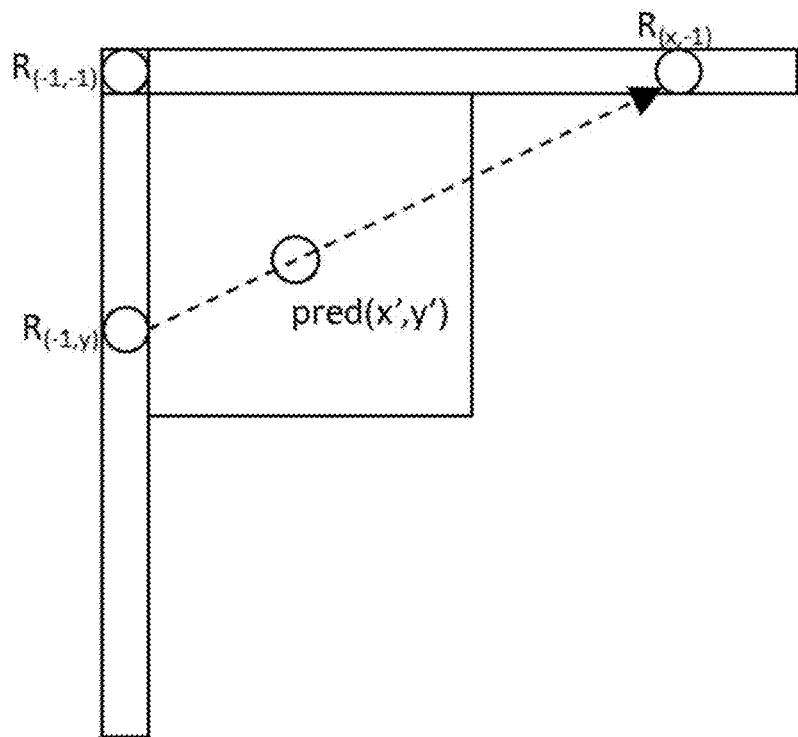
Figure 5D:
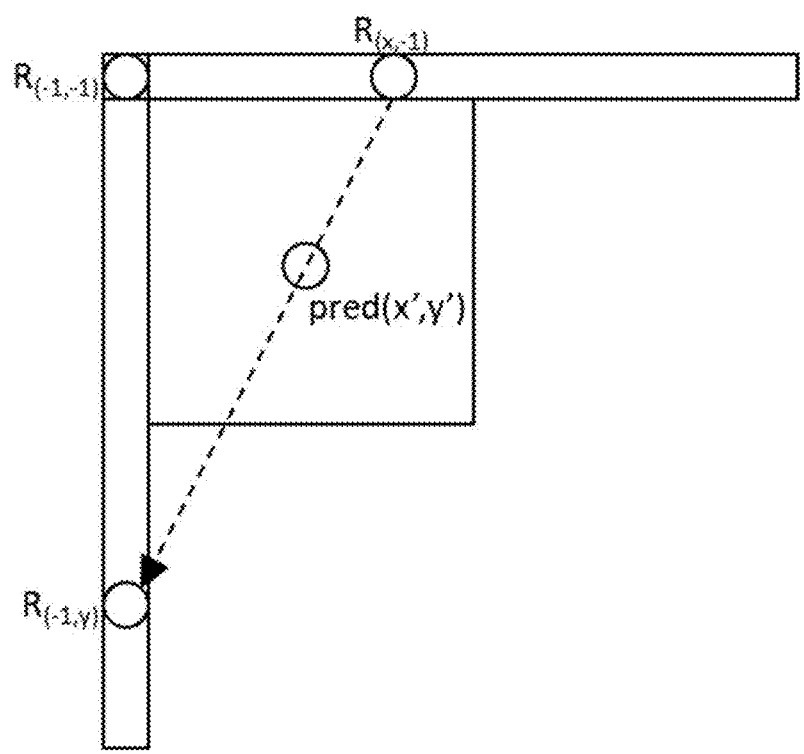

As shown in FIG. 4, two vertically-adjacent predicted samples may use two non-adjacent reference samples in the case of wide-angle intra prediction. Hence, low-pass reference samples filter and side smoothing are applied to the wide-angle prediction to reduce the negative effect of the increased gap $\Delta p_\alpha$.

1.4 Examples of Position Dependent Intra Prediction Combination (PDPC)

In the VTM2, the results of intra prediction of planar mode are further modified by a position dependent intra prediction combination (PDPC) method. PDPC is an intra prediction method which invokes a combination of the un-filtered boundary reference samples and HEVC style intra prediction with filtered boundary reference samples. PDPC is applied to the following intra modes without signaling: planar, DC, horizontal, vertical, bottom-left angular mode and its eight adjacent angular modes, and top-right angular mode and its eight adjacent angular modes.

The prediction sample pred(x,y) is predicted using an intra prediction mode (DC, planar, angular) and a linear combination of reference samples according to the Equation as follows:

pred(x,y)=(wL×R$_{-1,y}$+wT×R$_{x,-1}$−wTL×R$_{-1,-1}$+(64−wL−wT+wTL)×pred(x,y)+32)>>shift Herein, $R_{x,-1}$, $R_{-1,y}$ represent the reference samples located at the top and left of current sample (x,y), respectively, and $R_{-1,-1}$ represents the reference sample located at the top-left corner of the current block.

In some embodiments, and if PDPC is applied to DC, planar, horizontal, and vertical intra modes, additional boundary filters are not needed, as required in the case of HEVC DC mode boundary filter or horizontal/vertical mode edge filters.

FIGS. 5A-5D illustrate the definition of reference samples ($R_{x,-1}$, $R_{-1,y}$ and $R_{-1,-1}$) for PDPC applied over various prediction modes. The prediction sample pred (x', y') is located at (x', y') within the prediction block. The coordinate x of the reference sample $R_{x,-1}$ is given by: x=x'+y'+1, and the coordinate y of the reference sample $R_{-1,y}$ is similarly given by: y=x'+y'+1.

In some embodiments, the PDPC weights are dependent on prediction modes and are shown in Table 2, where S=shift.

TABLE 2

Examples of PDPC weights according to prediction modes

| Prediction modes | wT | wL | wTL |
|---|---|---|---|
| Diagonal top-right | 16 >> ((y' << 1) >> S) | 16 >> ((x' << 1) >> S) | 0 |
| Diagonal bottom-left | 16 >> ((y' << 1) >> S) | 16 >> ((x' << 1) >> S) | 0 |
| Adjacent diag. top-right | 32 >> ((y' << 1) >> S) | 0 | 0 |
| Adjacent diag. bottom-left | 0 | 32 >> ((x' << 1) >> S) | 0 |

1.5 Examples of Chroma Coding

In HEVC chroma coding, five modes (including one direct mode (DM) which is the intra prediction mode from the top-left corresponding luma block and four default modes) are allowed for a chroma block. The two color components share the same intra prediction mode.

In some embodiments, and different from the design in HEVC, two new methods have been proposed, including: cross-component linear model (CCLM) prediction mode and multiple DMs.

1.5.1 Examples of the Cross-Component Linear Model (CCLM)

In some embodiments, and to reduce the cross-component redundancy, a cross-component linear model (CCLM) prediction mode (also referred to as LM), is used in the JEM, for which the chroma samples are predicted based on the reconstructed luma samples of the same CU by using a linear model as follows:

$$pred_C(i,j)=\alpha \cdot rec_L'(i,j)+\beta \quad (1)$$

Here, $pred_C$ (i,j) represents the predicted chroma samples in a CU and $rec_L'(i,j)$ represents the downsampled reconstructed luma samples of the same CU for color formats 4:2:0 or 4:2:2 while $rec_L'(i,j)$ represents the reconstructed luma samples of the same CU for color format 4:4:4. CCLM parameters α and β are derived by minimizing the regression error between the neighboring reconstructed luma and chroma samples around the current block as follows:

$$\alpha = \frac{N \cdot \sum (L(n)C(n)) - \sum L(n) \cdot \sum C(n)}{N \cdot \sum (L(n) \cdot L(n)) - \sum L(n) \cdot \sum L(n)} \quad (2)$$

and $$\beta = \frac{\sum C(n) - \alpha \cdot \sum L(n)}{N}. \quad (3)$$

Here, L(n) represents the down-sampled (for color formats 4:2:0 or 4:2:2) or original (for color format 4:4:4) top and left neighboring reconstructed luma samples, C(n) represents the top and left neighboring reconstructed chroma samples, and value of N is equal to twice of the minimum of width and height of the current chroma coding block.

Figure 6:
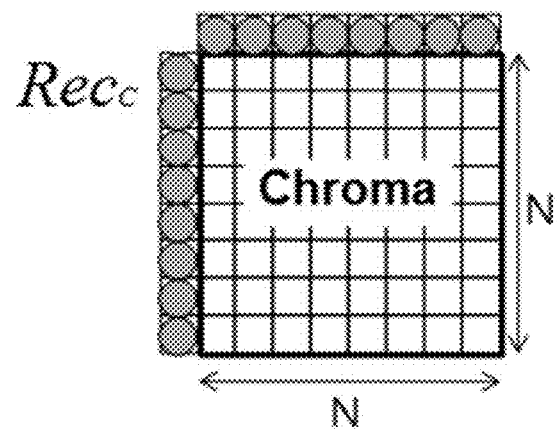
FIG. 6 shows an example of locations of samples used for the derivation of the weights of the linear model.
Figure 6:
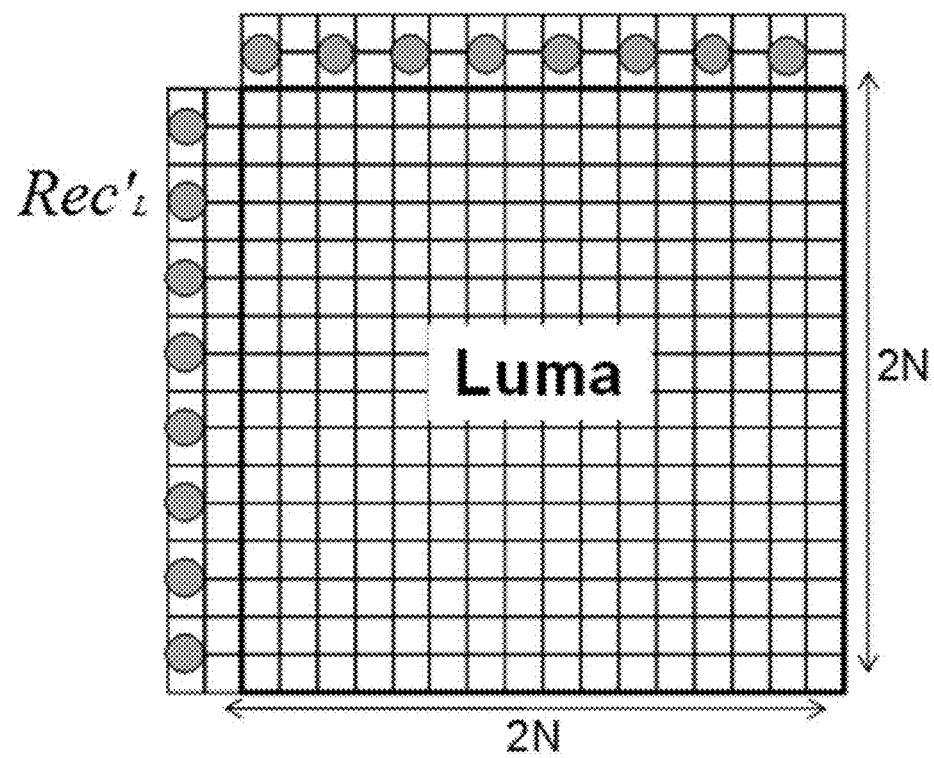

In some embodiments, and for a coding block with a square shape, the above two equations are applied directly. In other embodiments, and for a non-square coding block, the neighboring samples of the longer boundary are first subsampled to have the same number of samples as for the shorter boundary. FIG. 6 shows the location of the left and above reconstructed samples and the sample of the current block involved in the CCLM mode.

In some embodiments, this regression error minimization computation is performed as part of the decoding process, not just as an encoder search operation, so no syntax is used to convey the $\alpha$ and $\beta$ values.

In some embodiments, the CCLM prediction mode also includes prediction between the two chroma components, e.g., the Cr (red-difference) component is predicted from the Cb (blue-difference) component. Instead of using the reconstructed sample signal, the CCLM Cb-to-Cr prediction is applied in residual domain. This is implemented by adding a weighted reconstructed Cb residual to the original Cr intra prediction to form the final Cr prediction:

$$pred_{Cr}*(i,j) = pred_{Cr}(i,j) + \alpha \cdot resi_{Cb}'(i,j) \quad (4)$$

Here, $resi_{Cb}'(i,j)$ presents the reconstructed Cb residue sample at position (i,j).

In some embodiments, the scaling factor $\alpha$ may be derived in a similar way as in the CCLM luma-to-chroma prediction. The only difference is an addition of a regression cost relative to a default $\alpha$ value in the error function so that the derived scaling factor is biased towards a default value of −0.5 as follows:

$$\alpha = \frac{N \cdot \sum (Cb(n) \cdot Cr(n)) - \sum Cb(n) \cdot \sum Cr(n) + \lambda \cdot (-0.5)}{N \cdot \sum (Cb(n) \cdot Cb(n)) - \sum Cb(n) \cdot \sum Cb(n) + \lambda} \quad (5)$$

Here, Cb(n) represents the neighboring reconstructed Cb samples, Cr(n) represents the neighboring reconstructed Cr samples, and $\lambda$ is equal to $\Sigma(Cb(n) \cdot Cb(n)) >> 9$.

In some embodiments, the CCLM luma-to-chroma prediction mode is added as one additional chroma intra prediction mode. At the encoder side, one more RD cost check for the chroma components is added for selecting the chroma intra prediction mode. When intra prediction modes other than the CCLM luma-to-chroma prediction mode is used for the chroma components of a CU, CCLM Cb-to-Cr prediction is used for Cr component prediction.

1.5.2 Examples of a Multiple Model CCLM

In the JEM, there are two CCLM modes: the single model CCLM mode and the multiple model CCLM mode (MMLM). As indicated by the name, the single model CCLM mode employs one linear model for predicting the chroma samples from the luma samples for the whole CU, while in MMLM, there can be two models.

In MMLM, neighboring luma samples and neighboring chroma samples of the current block are classified into two groups, each group is used as a training set to derive a linear model (i.e., a particular $\alpha$ and $\beta$ are derived for a particular group). Furthermore, the samples of the current luma block are also classified based on the same rule for the classification of neighboring luma samples.

FIG. 7 shows an example of classifying the neighboring samples into two groups. Threshold is calculated as the average value of the neighboring reconstructed luma samples. A neighboring sample with $Rec'_L[x,y] <= Threshold$ is classified into group 1; while a neighboring sample with $Rec'_L[x,y] > Threshold$ is classified into group 2.

$$\begin{cases} Pred_c[x,y] = \alpha_1 \times Rec'_L[x,y] + \beta_1 & Rec'_L[x,y] \le \text{Threshold} \\ Pred_c[x,y] = \alpha_2 \times Rec'_L[x,y] + \beta_2 & Rec'_L[x,y] > \text{Threshold} \end{cases} \quad (6)$$

FIGS. 8A and 8B show an example of a chroma sample and its corresponding luma samples, and an example of down filtering for the cross-component linear model (CCLM) in the Joint Exploration Model (JEM), respectively.

1.5.3 Examples of Chroma Coding in VVC

With regard to existing implementations, CCLM as in JEM is adopted in VTM-2.0, whereas MM-CCLM in JEM has not been adopted in VTM-2.0.

Figure 9A:
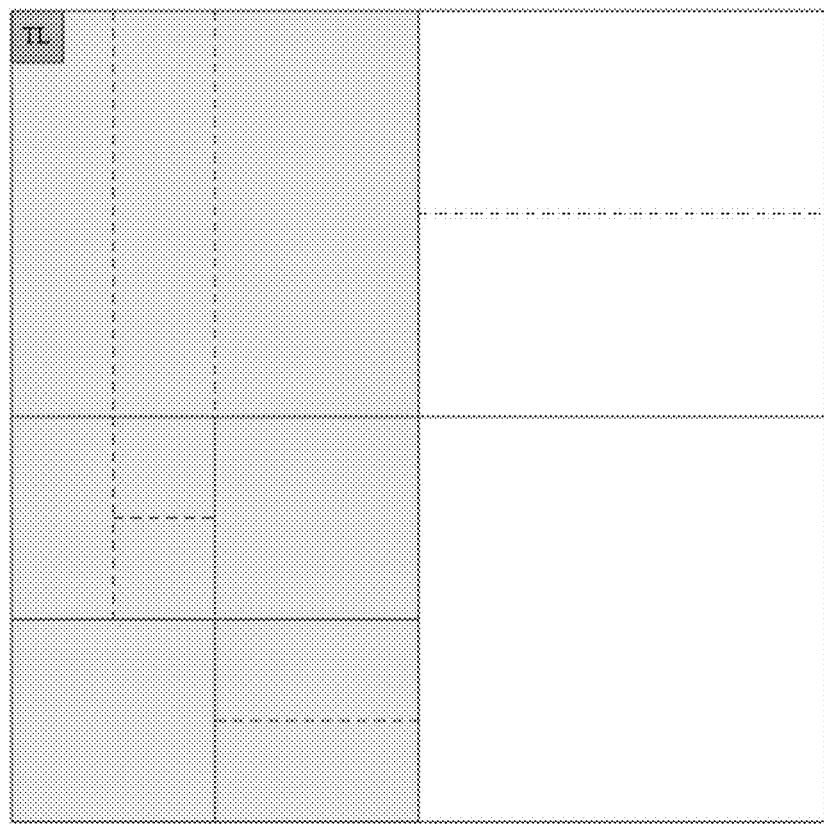
FIGS. 9A and 9B show examples of a chroma block and its corresponding luma block.
Figure 9B:
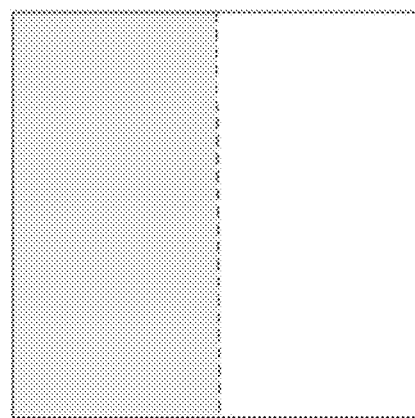
Figure 10:
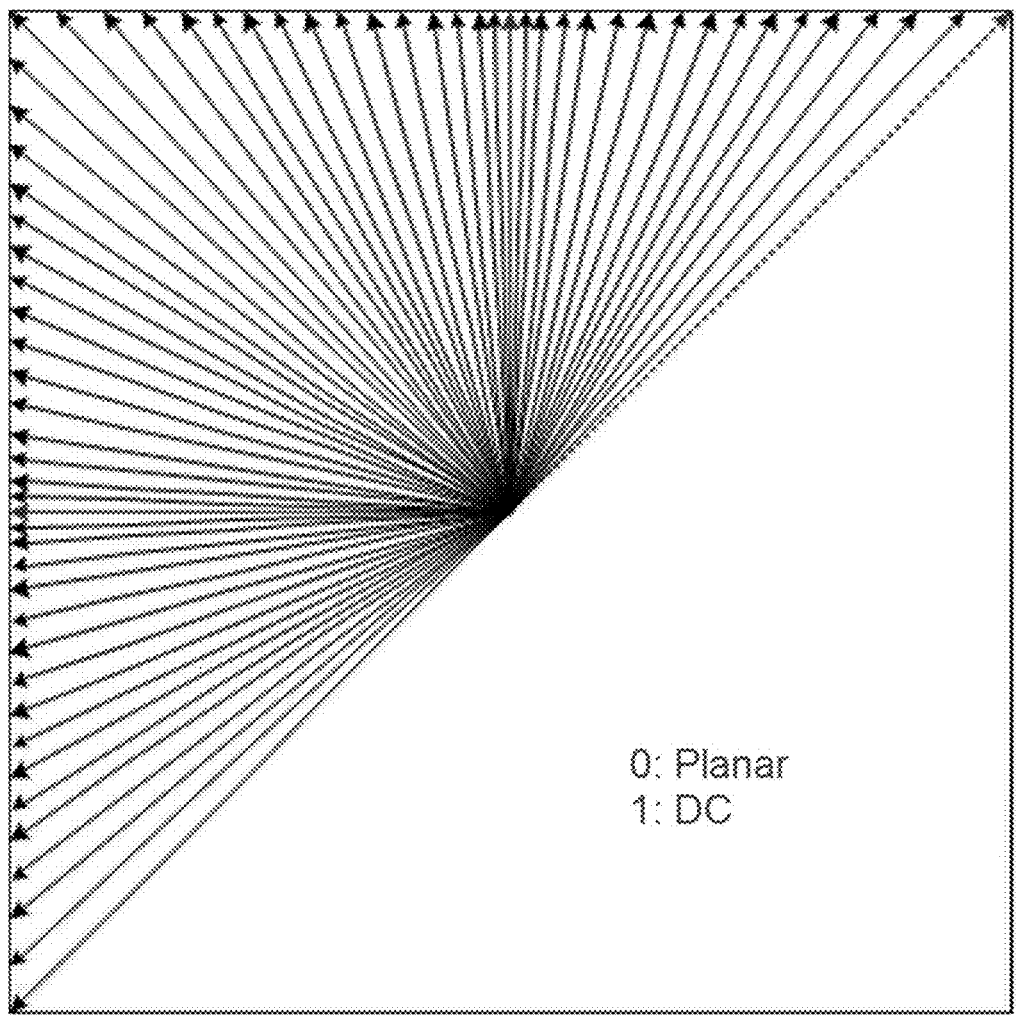
FIG. 10 shows an example of intra prediction modes with default modes.

In some embodiments, for chroma intra coding, a candidate list of chroma intra prediction modes may be derived first, and wherein three parts may be included:

(1) One direct mode (DM) which is set to the one intra luma prediction mode associated with luma CB covering the co-located top-left position of a chroma block. An example is shown in FIGS. 9A and 9B with the co-located position denoted as "TL"
(2) One cross-component linear model (CCLM) mode
(3) Four default modes (DC, Planar, Horizontal, and Vertical modes, as highlighted in FIG. 1). In an example, if one of the four default modes is identical to the DM mode, it is replaced by the intra prediction mode with largest mode index, e.g., indicated by the dashed line depicted in FIG. 10.

1.6 Examples of Syntax, Semantics and Decoding in VVC2

In some embodiments, the syntax and semantics of intra mode related information may be specified as follows:

TABLE 3

Example of a coding unit (CU) syntax

| | Descriptor |
|---|---|
| coding_unit( x0, y0, cbWidth, cbHeight, treeType ) { | |
|   if( slice_type != I ) { | |
|     pred_mode_flag | ae(v) |
|   } | |
|   if( CuPredMode[ x0 ][ y0 ] = = MODE_INTRA ) { | |

TABLE 3-continued

Example of a coding unit (CU) syntax

| | Descriptor |
|---|---|
| if( treeType = = SINGLE_TREE \| \| treeType = = DUAL_TREE_LUMA ) {<br>  intra_luma_mpm_flag[ x0 ][ y0 ]<br>  if( intra_luma_mpm_flag[ x0 ][ y0 ] )<br>    intra_luma_mpm_idx[ x0 ][ y0 ]<br>  else<br>    intra_luma_mpm_remainder[ x0 ][ y0 ]<br>}<br>if( treeType = = SINGLE_TREE \| \| treeType = = DUAL_TREE_CHROMA )<br>  intra_chroma_pred_mode[ x0 ][ y0 ]<br>} else {<br>  [Ed. (BB): Inter prediction yet to be added, pending further specification development.]<br>}<br>if( CuPredMode[ x0 ][ y0 ] != MODE_INTRA )<br>  cu_cbf<br>if( cu_cbf ) {<br>  transform_tree( x0, y0, cbWidth, cbHeight, treeType )<br>} | <br><br><br>ae(v)<br><br>ae(v)<br><br><br><br>ae(v)<br><br><br><br><br><br>ae(v) |

Examples of coding unit semantics. In some embodiments, the syntax elements intra_luma_mpm_flag[x0][y0], intra_luma_mpm_idx[x0][y0] and intra_luma_mpm_remainder[x0][y0] specify the intra prediction mode for luma samples. The array indices x0, y0 specify the location (x0, y0) of the top-left luma sample of the considered prediction block relative to the top-left luma sample of the picture. When intra_luma_mpm_flag[x0][y0] is equal to 1, the intra prediction mode is inferred from a neighbouring intra-predicted prediction unit according to the specification (e.g., clause 8.2.2).

In some embodiments, intra_chroma_pred_mode[x0][y0] specifies the intra prediction mode for chroma samples. The array indices x0, y0 specify the location (x0, y0) of the top-left luma sample of the considered prediction block relative to the top-left luma sample of the picture.

Examples of deriving the luma intra prediction mode. In some embodiments, an input to this process is a luma location (xPb, yPb) specifying the top-left sample of the current luma prediction block relative to the top-left luma sample of the current picture. In this process, the luma intra prediction mode IntraPredModeY[xPb][yPb] is derived. Table 4 specifies the value for the intra prediction mode and the associated names.

TABLE 4

Example specification of intra prediction modes and associated names

| Intra prediction mode | Associated name |
|---|---|
| 0 | INTRA_PLANAR |
| 1 | INTRA_DC |
| 2 . . . 66 | INTRA_ANGULAR2 . . . INTRA_ANGULAR66 |
| 77 | INTRA_CCLM |

In the context of Table 4, the intra prediction mode INTRA_CCLM is only applicable to chroma components, and IntraPredModeY[xPb][yPb] labelled 0 . . . 66 represents directions of predictions as shown in FIG. 1. In some embodiments, IntraPredModeY[xPb][yPb] is derived by the following ordered steps:
1. The neighbouring locations (xNbA, yNbA) and (xNbB, yNbB) are set equal to (xPb−1, yPb) and (xPb, yPb−1), respectively.
2. For X being replaced by either A or B, the variables candIntraPredModeX are derived as follows:

The availability derivation process for a block is invoked with the location (xCurr, yCurr) set equal to (xPb, yPb) and the neighbouring location (xNbY, yNbY) set equal to (xNbX, yNbX) as inputs, and the output is assigned to availableX.

The candidate intra prediction mode candIntraPredModeX is derived as follows:
If one or more of the following conditions are true, candIntraPredModeX is set equal to INTRA_DC.
The variable availableX is equal to FALSE.
CuPredMode[xNbX][yNbX] is not equal to MODE_INTRA.
X is equal to B and yPb−1 is less than ((yPb>>CtbLog 2SizeY)<<CtbLog 2SizeY).
Otherwise, candIntraPredModeX is set equal to IntraPredModeY[xNbX][yNbX].

3. The candModeList[x] with x=0 . . . 2 is derived as follows:
If candIntraPredModeB is equal to candIntraPredModeA, the following applies:
If candIntraPredModeA is less than 2 (i.e., equal to INTRA_PLANAR or INTRA_DC), candModeList[x] with x=0 . . . 2 is derived as follows:

candModeList[0]=INTRA_PLANAR     (8-1)

candModeList[1]=INTRA_DC     (8-2)

candModeList[2]=INTRA_ANGULAR50     (8-3)

Otherwise, candModeList[x] with x=0 . . . 2 is derived as follows:

candModeList[0]=candIntraPredModeA     (8-4)

candModeList[1]=2+((candIntraPredModeA+61)% 64)     (8-5)

candModeList[2]=2+((candIntraPredModeA−1)% 64)     (8-6)

Otherwise (candIntraPredModeB is not equal to candIntraPredModeA), the following applies:
candModeList[0] and candModeList[1] are derived as follows:

candModeList[0]=candIntraPredModeA     (8-7)

candModeList[1]=candIntraPredModeB     (8-8)

If neither of candModeList[0] and candModeList[1] is equal to INTRA_PLANAR, candModeList[2] is set equal to INTRA_PLANAR, Otherwise, if neither of candModeList[0] and candModeList[1] is equal to INTRA_DC, candModeList[2] is set equal to INTRA_DC, Otherwise, candModeList[2] is set equal to INTRA_ANGULAR50.

4. IntraPredModeY[xPb][yPb] is derived by applying the following procedure:

If intra_luma_mpm_flag[xPb][yPb] is equal to 1, the IntraPredModeY[xPb][yPb] is set equal to candModeList[intra_luma_mpm_idx[xPb][yPb]].

Otherwise, IntraPredModeY[xPb][yPb] is derived by applying the following ordered steps:

1. The array candModeList[x], x=0 . . . 2 is modified by the following ordered steps:
   i. When candModeList[0] is greater than candModeList[1], both values are swapped as follows:

(candModeList[0],candModeList[1])=Swap(candModeList[0],candModeList[1])   (8-9)

ii. When candModeList[0] is greater than candModeList[2], both values are swapped as follows:

(candModeList[0],candModeList[2])=Swap(candModeList[0],candModeList[2])   (8-10)

iii. When candModeList[1] is greater than candModeList[2], both values are swapped as follows:

(candModeList[1],candModeList[2])=Swap(candModeList[1],candModeList[2])   (8-11)

2. IntraPredModeY[xPb][yPb] is derived by the following ordered steps:
   i. IntraPredModeY[xPb][yPb] is set equal to intra_luma_mpm_remainder[xPb][yPb].
   ii. For i equal to 0 to 2, inclusive, when IntraPredModeY[xPb][yPb] is greater than or equal to candModeList[i], the value of IntraPredModeY[xPb][yPb] is incremented by one.

The variable IntraPredModeY[x][y] with x=xPb . . . xPb+cbWidth−1 and y=yPb . . . yPb+cbHeight−1 is set to be equal to IntraPredModeY[xPb][yPb].

Examples of deriving the chroma intra prediction mode. In some embodiments, an input to this process is a luma location (xPb, yPb) specifying the top-left sample of the current chroma prediction block relative to the top-left luma sample of the current picture. In this process, the chroma intra prediction mode IntraPredModeC[xPb][yPb] is derived.

In some embodiments, the chroma intra prediction mode IntraPredModeC[xPb][yPb] is derived using intra_chroma_pred_mode[xPb][yPb] and IntraPredModeY[xPb][yPb] as specified in Table 5 and Table 6.

TABLE 5

Example specification of IntraPredModeC[xPb][yPb] for sps_cclm_enabled_flag = 0

| intra_chroma_pred_mode [xPb][yPb] | IntraPredModeY[xPb][yPb] | | | | |
|---|---|---|---|---|---|
| | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |

TABLE 6

Example specification of IntraPredModeC[xPb][yPb] for sps_cclm_enabled_flag = 1

| intra_chroma_pred_mode [xPb][yPb] | IntraPredModeY[xPb][yPb] | | | | |
|---|---|---|---|---|---|
| | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 77 | 77 | 77 | 77 | 77 |
| 5 | 0 | 50 | 18 | 1 | X |

1.7 Examples of Multiple Direct Modes (DMs)

Figure 11A:
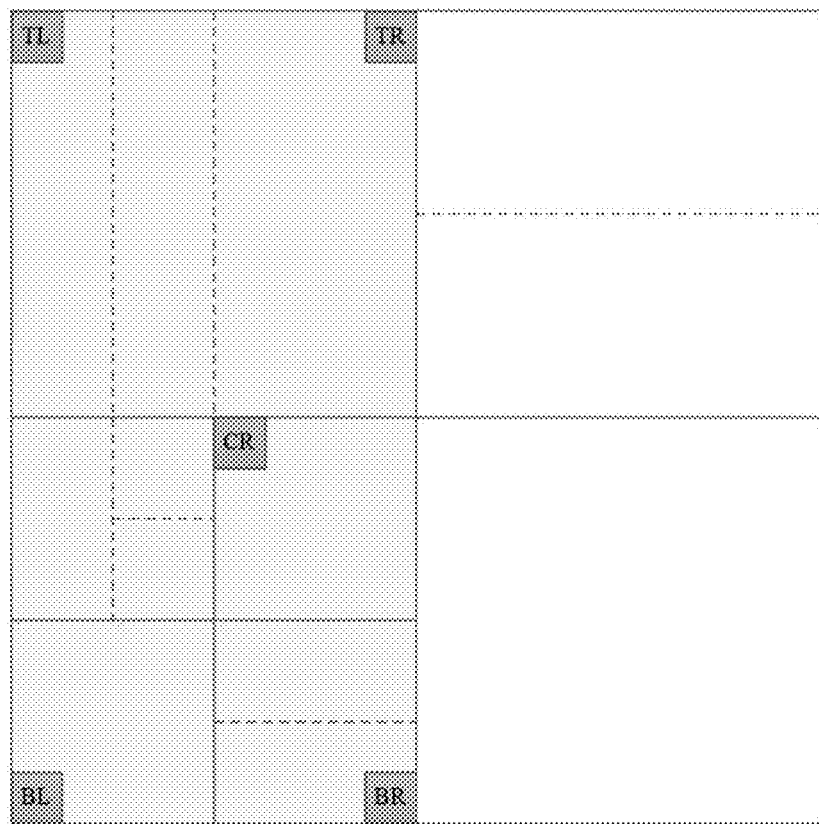
FIGS. 11A and 11B show examples of corresponding sub-blocks for a chroma CB.
Figure 11B:
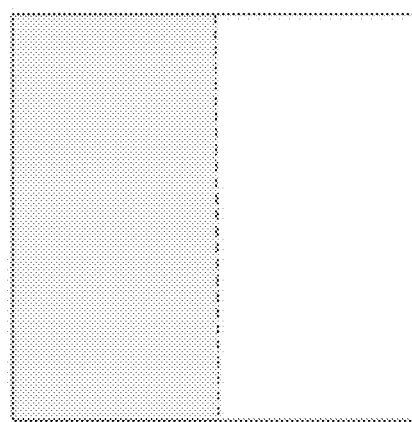

An existing implementation (e.g., JVET-D0111) was recently adopted by JEM. Due to the separate block partitioning structure for luma and chroma components in I slices, one chroma CB may correspond to several luma CBs. Therefore, to further improve the coding efficiency, a Multiple Direct Modes (MDM) method for chroma intra coding is proposed. In MDM, the list of chroma mode candidates includes the following three parts:

(1) the CCLM mode
(2) Intra prediction modes derived from luma CBs covering the co-located five positions of the current chroma block: the five positions to be checked in order are defined as: center, top-left, top-right, bottom-left and bottom-right 4×4 block within the corresponding luma block of current chroma block for I slices. For P and B slices, there is no need to check these five sub-blocks since they shall be within one CB. An example of five co-located luma positions is shown in FIGS. 11A and 11B, they are denoted by CR, TL, TR, BL and BR, respectively.
(3) Chroma prediction modes from spatial neighboring blocks to unify the luma and chroma mode derivation process (with removals and additions notated):
   5 chroma prediction modes from left, above, below-left, above-right, and above-left spatial neighboring blocks of current block, and the locations of the five spatial blocks as in the merge mode (with Planar and DC modes being removed)
   With the planar and DC modes being added
   Derived modes are added, those intra modes are obtained by adding −1 or +1 to the angular modes which are already included into the list
   Default modes are added in the order of: Vertical (Mode 18), Horizontal (Mode 50), Mode 2, Mode 34, Mode 66, Mode 10, Mode 26 (with Mode 66, Mode 10 and Mode 26 being added)
   The addition of the rule that if any of the four default modes (Planar, Horizontal, Vertical and DC modes)

is not included in the list, the missing default modes are used to replace the last one or more candidates.

In some embodiments, the pruning process is applied whenever a new chroma intra mode is added to the candidate list. In this contribution, the chroma intra mode candidate list size is always set to 10.

1.8 Examples of Intra Block Copy

In some embodiments, HEVC screen content coding (SCC) extensions employ a new coding tool, Intra block copy (IBC), also named intra picture block compensation or current picture referencing (CPR), is a very efficient technique in terms of coding performance improvement. IBC is a block matching technique wherein a current prediction block is predicted from a reference block located in the already reconstructed regions of the same picture.

In IBC, a displacement vector (referred as block vector or BV, or motion vector) is used to signal the relative displacement from the position of the current block to that of the reference block. Further, the previously reconstructed reference block within the same picture is added to the prediction errors to form the reconstructed current block. In this technique, the reference samples correspond to the reconstructed samples of the current picture prior to in-loop filter operations. In HEVC, the in-loop filters refer to both deblocking and sample adaptive offset (SAO) filters. An example of the intra block compensation is shown in FIG. 12.

In some embodiments, the use of the IBC mode is signaled at both sequence and picture level. When the IBC mode is enabled at sequence parameter set (SPS), it can be enabled at picture level. When the IBC mode is enabled at picture level, the current reconstructed picture is treated as a reference picture. Therefore, no syntax change on block level is needed in HEVC SCC on top of the existing HEVC inter mode to signal the use of the IBC mode.

In some embodiments, the following is a list of features for the IBC mode in HEVC SCC:

All prediction unit partition modes in the HEVC inter mode are supported in the IBC mode, e.g., 2N×2N or 2N×N or N×2N or N×N and Asymmetrical Motion Partitioning (AMP) modes.

Merge and skip modes are also available for the IBC mode. The merge candidate list construction is unified, containing merge candidates from the neighboring positions that are either coded in the IBC mode or the HEVC inter mode. Depending on the selected merge index, the current block under merge or skip mode can merge into either an IBC mode coded neighbor or otherwise an HEVC inter mode coded one.

Block vector prediction and coding schemes for the IBC mode reuse the schemes used for motion vector prediction and coding in the HEVC inter mode (AMVP and MVD coding).

Residue transform, quantization and coefficient coding are the same as in the HEVC inter mode.

In addition to the features enumerated above, some embodiments comprise additional features (or treatments) for IBC modes, including:

The motion vector for the IBC mode, also referred as block vector, is coded with integer-pel precision, but stored in memory in quarter-pel precision after decoding as quarter-pel precision is required in interpolation and deblocking stages. When used in motion vector prediction for the IBC mode, the stored vector predictor will be right shifted by 2.

A slice with the IBC mode enabled will be treated as a P or B slice, even though no other picture than the current picture itself is used as a reference picture.

Weighted prediction is disabled for the IBC mode as there was no clear compression benefit observed.

2 Examples of Drawbacks in Existing Implementations

The current intra mode coding implementations in either JEM or VTM exhibit at least the following issues:

For luma coding, only prediction modes of adjacent spatial neighboring blocks are considered. The lack of statistic intra prediction information of previously coded blocks results in limited coding performance improvements.

In an existing implementation, it is proposed to check more neighboring blocks to be added to MPM list for better coding of intra prediction modes. The complexity is also increased due to multiple times of access of adjacent spatial neighboring blocks.

For chroma coding, the multiple DMs solution could bring additional coding gains at the cost of higher complexity since the neighboring chroma modes need to be stored which was not needed in HEVC.

IBC could take care of repeated patterns which are far from the current block and intra coding mode could take care of reducing less spatial correlation. However, either of the two could only be beneficial for a certain case.

3 Example Methods for Intra Mode Coding Based on Past Information

Embodiments of the presently disclosed technology overcome drawbacks of existing implementations, thereby providing video coding with higher coding efficiencies but lower computational complexity. Intra mode coding based on past information, and as described in the present document, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined.

Examples of Intra Mode Coding Based on Historical Information

Example 1. In one example, a table with statistical information of intra prediction modes (IPMs) may be maintained in the encoding/decoding process to help intra mode coding.

(a) In one example, the table includes the occurrence and/or frequency of each IPM. Alternatively, the table may have entries for a partial set of allowed IPMs.

(b) Partial of IPMs listed in the table may be added as new MPMs to the MPM list.

(i) In one example, IPMs from spatial neighboring blocks are firstly added to the MPM list in order. Afterwards, a few IPMs from the table may be added in order after pruning. If the list is not full, derived IPMs may be further added.

(ii) In one example, MPM list size may be extended. In this case, IPMs from spatial neighboring blocks and derived modes may be firstly added to the MPM list in order. Afterwards, a few IPMs from the table may be added in order after pruning.

(c) IPMs included in a MPM list may be reordered based on the table.

(i) In one example, the MPM list is firstly constructed based on neighboring blocks and derived modes (e.g., as described in Section 1.2). Afterwards, MPM list is re-ordered based on the descending order of occurrence or frequency associated with IPMs recorded in the table. In such a way, a IPM in the MPM list with highest occurrence or frequency will be adjusted to be in the first position of the MPM list.

Example 2. Different tables may be used for different color components.
- (a) For example, a table is used for luma intra-mode coding and another table is used for chroma intra-mode coding.
- (b) Alternatively, only one table is used for luma intra-mode coding.
- (c) Alternatively, whether to use multiple tables or one table depend on whether separate coding trees are used for luma and chroma, respectively.

Example 3. The frequency or occurrence of one mode M in the table is accumulated by K (e.g. K=1) after decoding a block with mode M.
- (a) In one example, the occurrence of a mode has a maximum value (e.g. 255).
- (b) If at least one occurrence of a mode reaches the maximum value, a regulation (or normalization) process is applied.
  - (i) In one example, all occurrence number in the table is right shift by a number such as 2.
  - (ii) In another example, all occurrence number in the table subtract a number, such as the minimum occurrence number in the table.

Example 4. Instead of utilizing IPMs of adjacent neighboring blocks for coding a block, intra prediction modes of non-adjacent neighboring blocks may be utilized.
- (a) IPMs of non-adjacent neighboring blocks may be added to the MPM list. Alternatively, pruning of IPMs may be applied. If an IPM of a non-adjacent neighboring block is different from any of IPMs in the MPMS list, it may be added to the MPM list.
- (b) In one example, MPM list size may be extended. In this case, IPMs from adjacent neighboring blocks and derived modes may be firstly added to the MPM list in order. Afterwards, IPMs from non-adjacent neighboring blocks may be added in order after pruning.
- (c) IPMs of non-adjacent neighboring blocks may be used to re-order the non-MPM IPMs. In one example, for those IPMs associated with non-adjacent neighboring blocks, higher priority may be assigned, e.g., less bits may be used to code them.

Example 5. Coding of an IPM associated with current block may depend on the table, IPMs from adjacent spatial neighboring blocks, IPMs from non-adjacent spatial neighboring blocks.

Examples of Selection of Adjacent Neighboring Blocks

Figure 13C:
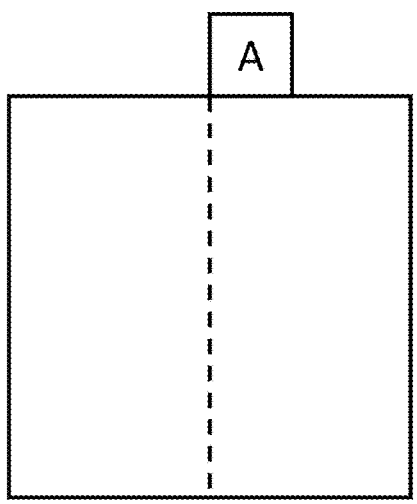
Figure 13D:
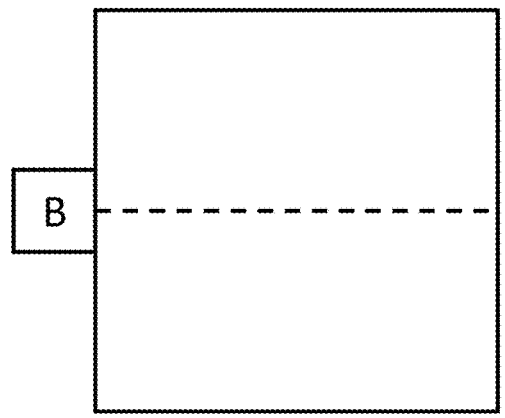
Figure 13E:
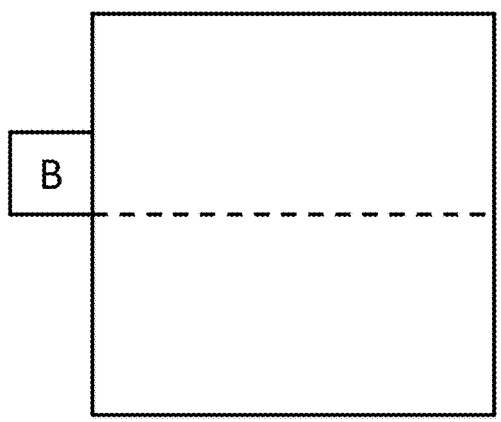
Figure 13F:
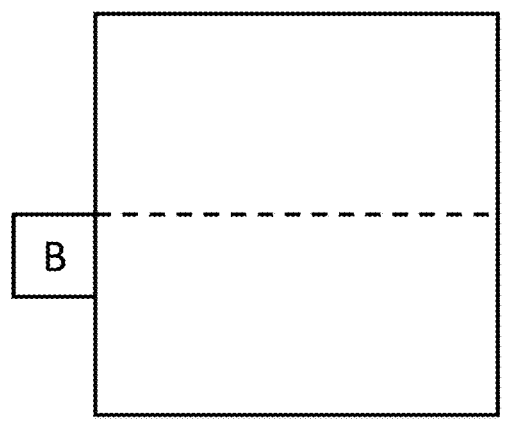

Example 6. Instead of using of the above and left neighboring blocks relative to the top-left position of current block for intra mode coding (such as using the intra prediction modes of above and left neighboring blocks to construct a MPM list), different positions may be utilized.
- (a) In one example, the above neighboring block relative to the top-left position of current block is replaced by the above neighboring block relative to the center position of the first row of current block, as shown in FIGS. 13A-13C.
- (b) In one example, the left neighboring block relative to the top-left position of current block is replaced by the left neighboring block relative to the center position of the first column of current block, as shown in FIGS. 13D-13F.

Example 7. Instead of utilizing the fixed M relative neighboring blocks for all kinds of blocks, selection of M neighboring blocks may depend on block shape and/or block size.
- (a) In one example, if the block is a square block, the intra prediction modes of above and left neighboring blocks relative to the to-left position of current block for intra mode coding may be used for coding intra prediction mode of current block.
- (b) In one example, if the block is a non-square block, the intra prediction modes of above and/or left neighboring blocks relative to the center position of the first row and/or the first column of current block for intra mode coding may be used for coding intra prediction mode of current block.

Examples of Multiple Prediction Blocks for One Intra-Coded Block

Example 8. Multiple prediction blocks may be generated with reconstructed samples from the same tile/slice/picture containing current block.
- (a) In one example, two prediction blocks may be firstly generated and the final prediction block is generated from the two prediction blocks. wherein one of them is generated by an intra prediction mode and the other is generated by a motion vector pointing to the same tile/slice/picture (e.g., intra block copy; and the motion vector is also known as block vector) containing current block.
- (b) In one example, linear function is applied to the two prediction blocks to derive a final intra prediction block.
  - (i) Alternatively, only partial of the final prediction block is generated from the multiple (e.g., two) prediction blocks and the remaining part is directly copied from one of the multiple prediction blocks.
  - (ii) In one example, average of the two prediction blocks (i.e., equal weights for the two prediction blocks) is used as the final intra prediction block.
  - (iii) In one example, different weight for different position relative to one block, and/or for different intra prediction mode may be applied.
  - (iv) In one example, weights may be signaled in SPS/PPS/VPS/picture or sequence or slice header/tile/groups of CTUs/CTU/CU/PU/TU.
  - (v) Weights applied to the two prediction blocks may be pre-defined.

Example 9. The above methods may be applied under certain conditions.
- (a) It may be applied for certain color components, e.g., only the luma component.
- (b) It may be applied for certain block size/block shape etc.

Example 10. When IBC is treated as inter mode (i.e., with at least one motion vector to derive the prediction block), History-based Motion Vector Prediction (HMVP) methods, which utilize previously coded motion information for motion information prediction may be used. The HMVP methods allow the encoding/decoding process to be performed based on historical data (e.g., the blocks that have been processed). One or multiple tables with motion information from previously coded blocks are maintained during the encoding/decoding process. Each table can be associated with a counter to track the number of motion candidates stored in the table. During the encoding/decoding of one block, the associated motion information in tables may be used (e.g., by being added to the motion candidate lists) depending on the coding characteristics of the block (e.g., whether the block is IBC coded). After encoding/decoding the block, the tables may be updated based on the coding characteristics of the block. That is, the updating of the tables is based on the encoding/decoding order. In some embodiments, the tables can be reset (e.g., removing the stored candidates and setting the associated counter to 0) before processing a new slice, a new largest coding unit (LCU) row, or a new tile.
  (a) In one example, look-up-tables may be updated with motion information from IBC-coded blocks.
  (b) Alternatively, look-up-tables are not allowed to be updated with motion information from IBC-coded blocks.
  (c) In one example, for the IBC mode, motion information from previously coded blocks are not allowed to predict the motion information of IBC-coded blocks.
  (d) In one example, only motion information from previously IBC-coded blocks can be used to predict motion information of the current IBC-coded block. One look-up table is used to include only motion information from IBC-coded blocks and such look-up table is only used for IBC-coded blocks.
  (e) Alternatively, for the IBC mode, motion information from previously coded blocks are allowed to predict the motion information of IBC-coded blocks.
    (i) In one example, a look-up table may include motion information from IBC-coded blocks and other kinds of inter-coded blocks. For example, if a motion candidate in the look-up table is derived from an IBC coded block, it may be used to encode/decode current IBC coded block.
    (ii) Alternatively, multiple look-up tables may be required and at least one of them only includes motion information from IBC-coded blocks and one of them only includes motion information from other kinds of inter-coded blocks. For example, a first look-up table can include motion information for an IBC-coded block. A second, different look-up table can include motion information for a block that is not IBC-coded (e.g., the block can be coded with an inter mode). The first and second look-up tables can be updated after the corresponding conversions are completed. In some embodiments, a first subsequent conversion of an IBC coded block can be performed using the updated first look-up table, and a second subsequent conversion of an inter coded block can be performed using the updated second look-up table.

In some embodiments, before updating look-up tables as described in Example 10 by adding a motion candidate obtained from a coded block, pruning may be applied.
  (a) In one example, the new motion candidate to be added need to be pruned to all existing motion candidates in selected tables. That is, the new motion candidate is compared against all existing motion candidates in selected tables to make sure that there are no duplicated candidates.
  (b) Alternatively, the new motion candidates may be only pruned to a certain number of existing motion candidates. For example, it may be compared against the last m motion candidates (m is an integer) in a look-up table before selectively adding it as the last entry of the LUT.
  (c) In some embodiments, the selected table is the one that is used to construct the motion candidate list for the coded block where the motion candidate is obtained from. In some embodiments, the motion candidate can be used to update partial or all of available look-up tables.

In some embodiments, the look-up tables as described in Example 10 may be used when a block is coded with merge or AMVP mode. That is, the current block can be coded using an IBC merge mode or an IBC AMVP mode.

In some embodiments, besides adjacent candidates, non-adjacent candidates (e.g., merge candidates or AMVP candidates) can be combined in the look-up tables.
  (a) In one example, m candidates (non-adjacent and/or adjacent candidates) and n motion candidates from look-up tables may be added (e.g., when the list is not full). Both m and n are positive integers (>0).
  (b) In one example, m candidates (non-adjacent and/or adjacent candidates) may be checked and/or n motion candidates from look-up tables may be checked. The checked candidates may be added when the list is not full.
  (c) In one example, the adjacent or non-adjacent candidates and motion candidates from look-up tables may be added in an interleaved way.
    (i) The order of checking the adjacent or non-adjacent candidates is kept unchanged. One candidate is checked is followed by a motion candidate from a look-up table.
    (ii) The order of checking non-adjacent blocks is kept unchanged. However, if one non-adjacent block is located outside a certain range (e.g., outside the current LCU row), it would be replaced by a motion candidate in a look-up table.
    (iii) In one example, the order of checking non-adjacent blocks is kept unchanged. However, if one adjacent or non-adjacent block is coded with intra mode or intra block copy mode, it would be replaced by a motion candidate in a look-up table (e.g., upon determining that the motion candidate in the look-up table is different from the adjacent or non-adjacent block).
  (d) In one example, non-adjacent candidates have a higher priority compared to motion candidates from look-up tables.
    (i) In this case, all the non-adjacent blocks are checked firstly. If the total number of candidates are still less than the maximumly allowed number, then motion candidates from look-up tables are further checked.
    (ii) Alternatively, motion candidates from look-up tables have a higher priority compared to non-adjacent candidates. Motion candidates from look-up tables are first checked. If the total number of candidates are still less than the maximumly allowed number, the non-adjacent blocks are checked to add non-adjacent candidates to the merge candidate list.
    (iii) Similarly, when both non-adjacent method and look-up-table-based method are allowed in the Advanced Motion Vector Prediction (AMVP) coding process, the priority could be handled in a similar way as described in above examples.

In some embodiments, similar to the usage of look-up tables with motion candidates for motion vector prediction, it is proposed that one or multiple look-up tables may be constructed, and/or updated to store intra prediction modes from previously coded blocks and look-up tables may be used for coding/decoding an intra-coded block.
  (a) Number of entries for each LUT is the same, e.g., equal to total number of allowed intra predictions.
  (b) A variable (i.e., cnt) may be further assigned for each intra prediction mode to record how many times the intra prediction mode has been used in previously coded blocks.

(c) When updating a look-up table with a selected intra prediction mode, the associated cnt can be modified, such as increasing by 1.

In some embodiments, intra prediction modes of non-adjacent blocks may be used as intra prediction mode predictors for coding an intra-coded block.

In some embodiments, look-up tables and non-adjacent based methods may be jointly utilized. In one example, the intra prediction modes in either look-up tables or non-adjacent blocks may be used in the MPM list construction process. Alternatively, the intra prediction modes in either look-up tables or non-adjacent blocks may be used to re-order non-MPM intra prediction modes.

In some embodiments, a motion candidate list for an IBC-coded block can be constructed as follows:

(a) If there exist unique block vectors (also referred to as displacement vectors or motion vectors as discussed above) that are associated with two spatial neighboring blocks of the current block, add them to the list.

(2) Check the last available motion candidate in the table (that is, the latest candidate). If there is no duplicated candidate in the list, the last available motion candidate is then added to the list.

(3) If the list is not full, add the remaining motion candidates in the look-up table.

The examples described above may be incorporated in the context of the methods described below, e.g., methods 1400, 1500 and 1600, which may be implemented at a video encoder and/or decoder.

Figure 14:
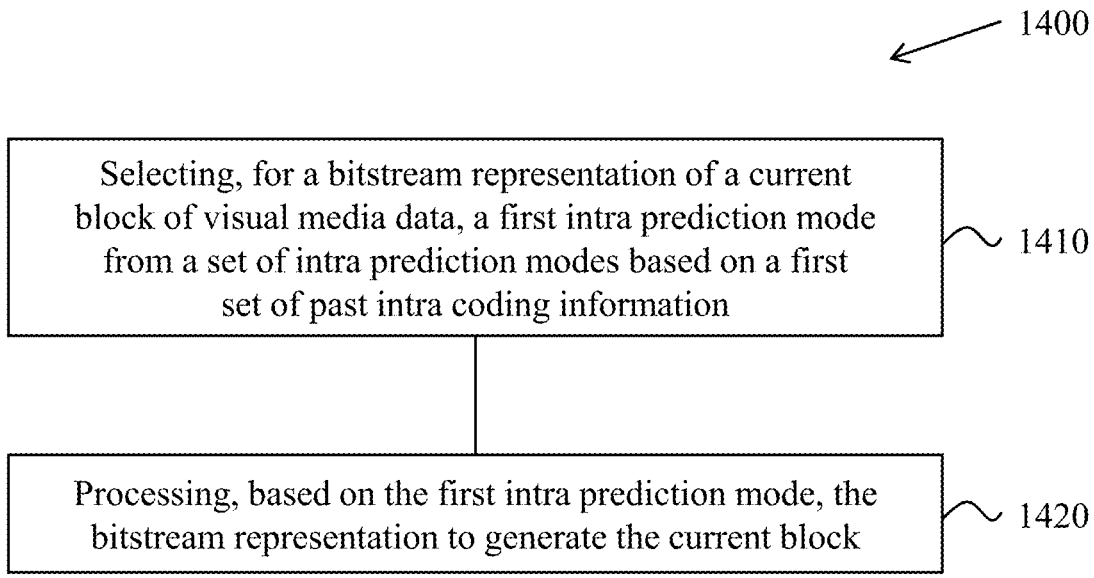
FIG. 14 shows a flowchart of an example method for intra-mode coding based on past information in accordance with the disclosed technology.

FIG. 14 shows a flowchart of an example method for cross-component prediction. The method 1400 includes, at step 1410, selecting, for a bitstream representation of a current block of visual media data, a first intra prediction mode from a set of intra prediction modes based on a first set of past intra coding information. In some embodiments, the first set of past intra coding information includes historical intra coding information.

In some embodiments, and in the context of Example 1, the first set of past intra coding information comprises statistical intra coding information. In one example, the statistical intra coding information comprises a number of occurrences of each of the set of intra prediction modes over a time duration, and the method 1400 further includes the steps of constructing a most probable mode (MPM) list based on neighboring blocks of the current block, and reordering the MPM list based on the number of occurrences.

The method 1400 includes, at step 1420, processing, based on the first intra prediction mode, the bitstream representation to generate the current block.

In some embodiments, and in the context of Example 2, the current block comprises a luma component and a chroma component, the first set of past intra coding information is used for intra-mode coding the luma component, and a second set of past intra coding information is used for intra-mode coding the chroma component. In an example, the luma component is based on a first coding tree, and the chroma component is based on a different second coding tree.

In some embodiments, and in the context of Example 3, the number of occurrences is incremented for an intra prediction mode of the set of intra prediction modes that corresponds to the first intra prediction mode. Then, the method 1400 further includes the step of determining that at least one of the number of occurrences is equal to a maximum number of occurrences. In one example, the method further includes right shifting each of the number of occurrences by a predefined number. In another example, the method further includes subtracting a minimum number of occurrences from each of the number of occurrences.

In some embodiments, and in the context of Example 4, the method 1400 further includes the step of adding a first subset of the set of intra prediction modes to a most probable mode (MPM) list. In other embodiments, the method 1400 may further include increasing a size of an MPM list, and adding a first subset of the set of intra prediction modes to the MPM list, wherein the first subset of intra prediction modes correspond to blocks that are spatial neighbors of the current block. In these cases, the method 1400 may further include pruning the MPM list, and adding a second subset of the set of intra prediction modes to the MPM list, wherein an ordering of intra prediction modes in the second subset is maintained in the MPM list.

Figure 15:
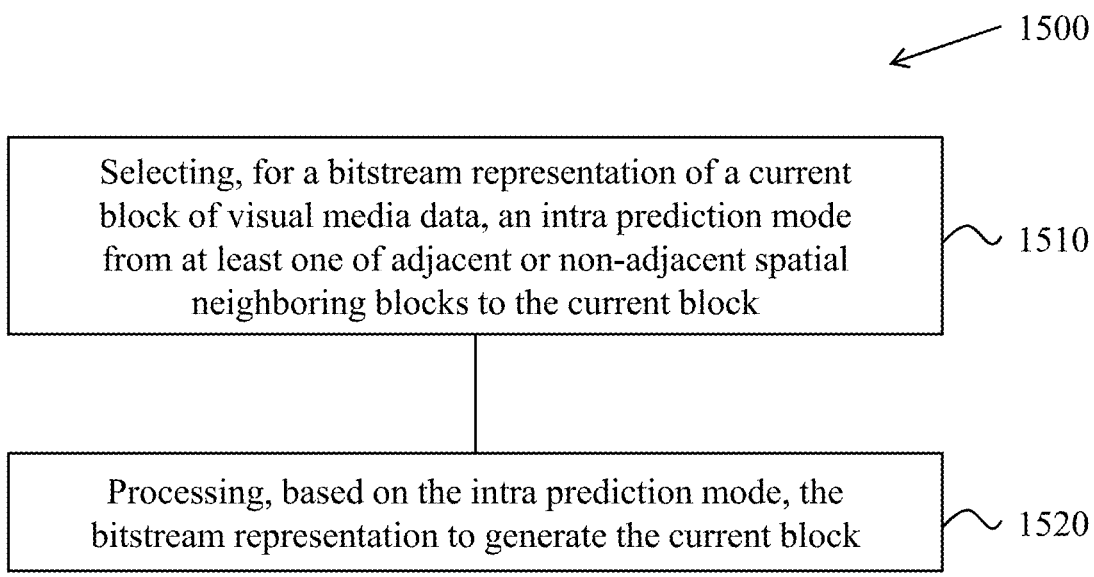
FIG. 15 shows a flowchart of another example method for intra-mode coding based on past information in accordance with the disclosed technology.

FIG. 15 shows a flowchart of another example method for cross-component prediction. The method 1500 includes, at step 1510, selecting, for a bitstream representation of a current block of visual media data, an intra prediction mode from at least one of adjacent or non-adjacent spatial neighboring blocks to the current block.

In some embodiments, and in the context of Example 6, the at least one of the adjacent spatial neighboring blocks is an above neighboring block relative to a top-left position of the current block, or an above neighboring block relative to a center position of a first row of the current block, or an above neighboring block relative to a top-right position of the current block, or a left neighboring block relative to a top-left position of the current block, or a left neighboring block relative to a center position of a first column of the current block, or a left neighboring block relative to a bottom-left position of the current block.

The method 1500 includes, at step 1520, processing, based on the intra prediction mode, the bitstream representation to generate the current block.

Figure 16:
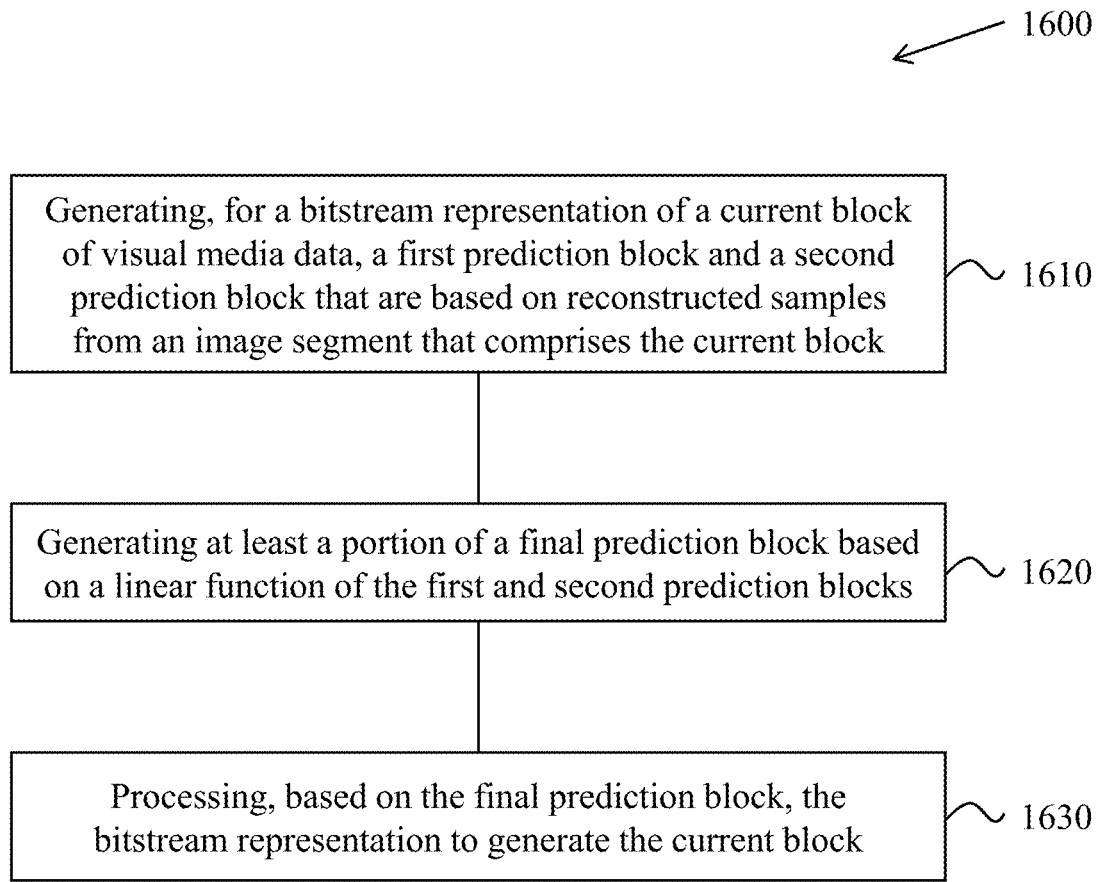
FIG. 16 shows a flowchart of yet another example method for intra-mode coding based on past information in accordance with the disclosed technology.

FIG. 16 shows a flowchart of yet another example method for cross-component prediction. The method 1600 includes, at step 1610, generating, for a bitstream representation of a current block of visual media data, a first prediction block and a second prediction block that are based on reconstructed samples from an image segment that comprises the current block.

The method 1600 includes, at step 1620, generating at least a portion of a final prediction block based on a linear function of the first and second prediction blocks. In some embodiments, the final prediction block is an average of the first and second prediction blocks.

In some embodiments, and in the context of Example 8, one portion of the final prediction block is based on the linear function of the first and second prediction blocks, and the remaining portion is copied directly from the first or second prediction blocks. In some embodiments, the weights of the linear function are signaled in a sequence parameter set (SPS), a picture parameter set (PPS), a video parameter set (VPS), a slice header, a tile header, a group of coding tree units (CTUs), a coding unit (CU), a prediction unit (PU) or a transform unit (TU).

The method 1600 includes, at step 1630, processing, based on the final prediction block, the bitstream representation to generate the current block.

5 Example Implementations of the Disclosed Technology

Figure 17:
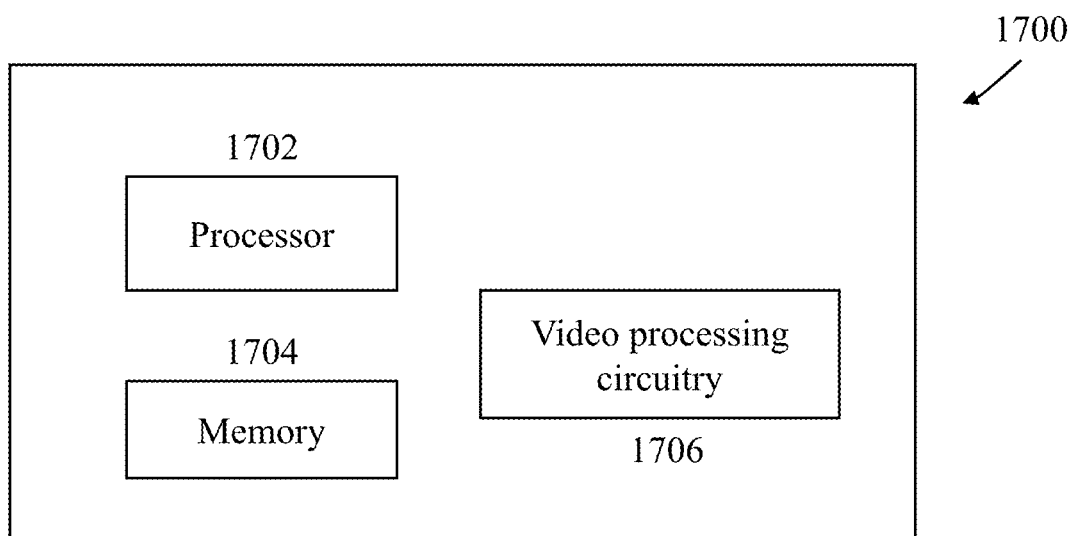
FIG. 17 is a block diagram of an example of a hardware platform for implementing a visual media decoding or a visual media encoding technique described in the present document.

FIG. 17 is a block diagram of a video processing apparatus 1700. The apparatus 1700 may be used to implement one or more of the methods described herein. The apparatus 1700 may be embodied in a smartphone, tablet, computer, Internet of Things (IoT) receiver, and so on. The apparatus 1700 may include one or more processors 1702, one or more memories 1704 and video processing hardware 1706. The processor(s) 1702 may be configured to implement one or more methods (including, but not limited to, methods 1400, 1500 and 1600) described in the present document. The memory (memories) 1704 may be used for storing data and code used for implementing the methods and techniques described herein. The video processing hardware 1706 may be used to implement, in hardware circuitry, some techniques described in the present document.

In some embodiments, the video coding methods may be implemented using an apparatus that is implemented on a hardware platform as described with respect to FIG. 17.

Figure 18:
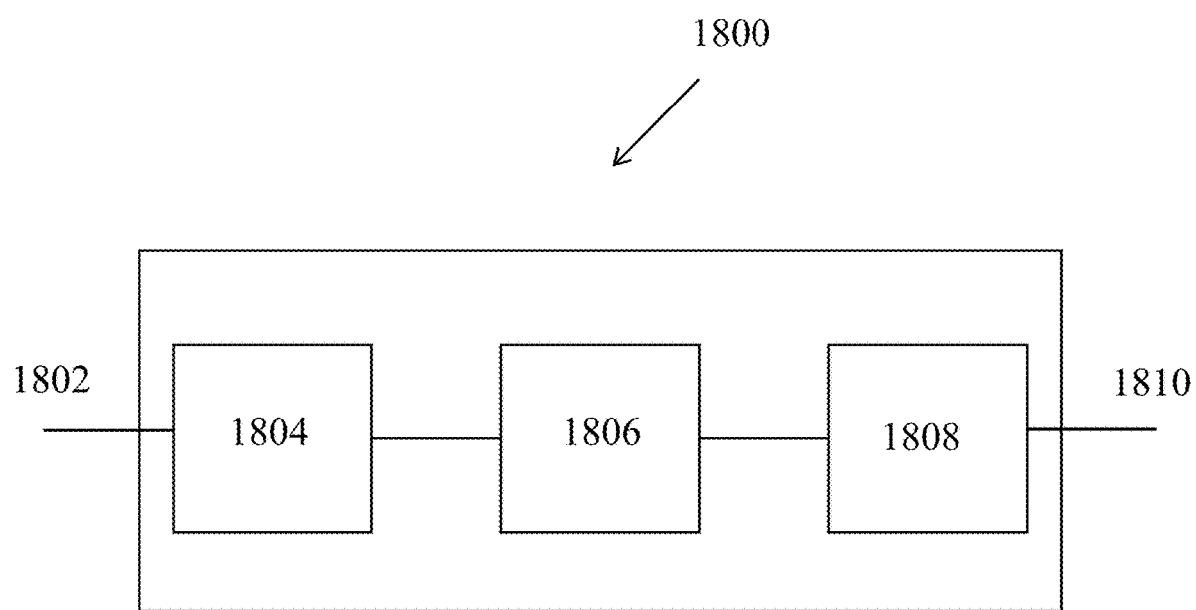
FIG. 18 is a block diagram of an example video processing system in which disclosed techniques may be implemented.

FIG. 18 is a block diagram showing an example video processing system 1800 in which various techniques disclosed herein may be implemented. Various implementations may include some or all of the components of the system 1800. The system 1800 may include input 1802 for receiving video content. The video content may be received in a raw or uncompressed format, e.g., 8 or 10 bit multi-component pixel values, or may be in a compressed or encoded format. The input 1802 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1800 may include a coding component 1804 that may implement the various coding or encoding methods described in the present document. The coding component 1804 may reduce the average bitrate of video from the input 1802 to the output of the coding component 1804 to produce a coded representation of the video. The coding techniques are therefore sometimes called video compression or video transcoding techniques. The output of the coding component 1804 may be either stored, or transmitted via a communication connected, as represented by the component 1806. The stored or communicated bitstream (or coded) representation of the video received at the input 1802 may be used by the component 1808 for generating pixel values or displayable video that is sent to a display interface 1810. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 19:
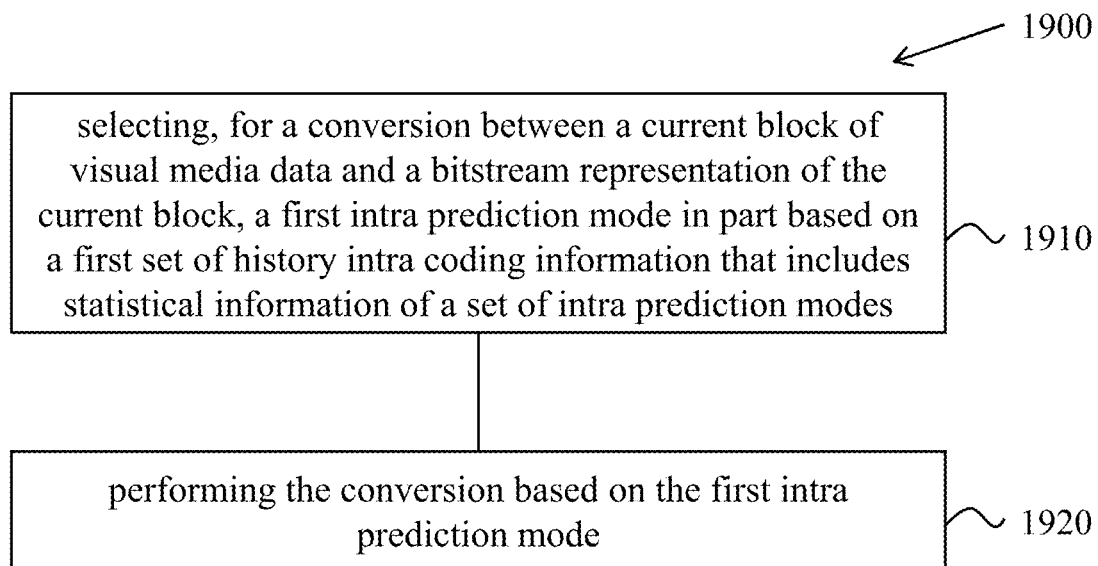
FIG. 19 shows a flowchart of an example method for video processing in accordance with the disclosed technology.

FIG. 19 shows a flowchart of an example method 1900 for video coding in accordance with the disclosed technology. The method 1900 includes, at operation 1910, selecting, for a conversion between a current block of visual media data and a bitstream representation of the current block, a first intra prediction mode based on at least a first set of history intra coding information that includes statistical information of a set of intra prediction modes. The method 1900 also includes, at operation 1920, performing the conversion based on the first intra prediction mode.

In some embodiments, the conversion includes encoding the current block to generate the bitstream representation. In some embodiments, the conversion includes decoding the bitstream representation to generate the current block. In some embodiments, the statistical intra coding information comprises a number of occurrences of each of the set of intra prediction modes over a time duration. In some embodiments, the statistical intra coding information comprises a number of occurrences of a part of the set of intra prediction modes over a time duration.

In some embodiments, the method further includes, comprising, after performing the conversion, updating the set of history intra coding information. In some embodiments, the updating comprises accumulating the number of occurrences of the first intra prediction mode by k in the first set of history intra coding information, k being a positive integer. In some embodiments, a subsequent block of the current block is processed based on the updated history intra coding information.

In some embodiments, each intra prediction mode in the first set of history intra coding information is associated with a limit for the number of occurrences. In some embodiments, the method includes, after the number of occurrences reaches the limit, reducing the number of occurrences based on a predefined rule. In some embodiments, the predefined rule comprises dividing the number of occurrences by a first predefined value, or subtracting a second predefined value from the number of occurrences.

In some embodiments, the method includes constructing a most probable mode (MPM) list based on at least the set of intra prediction modes. In some embodiments, the method includes adding a subset of the set of intra prediction modes to the MPM list. In some embodiments, the method includes adding intra prediction modes associated with spatial neighbors of the current block to the MPM list, adding a subset of the set of intra prediction modes to the MPM list, and pruning the MPM list. In some embodiments, the method includes adding derived intra prediction modes to the MPM list. In some embodiments, the method includes increasing a size of the MPM list. In some embodiments, the method includes reordering the MPM list based on the set of history intra coding information. In some embodiments, the MPM list is reordered based on a descending order of the statistical information of the set of intra prediction modes.

In some embodiments, the current block comprises a luma component and a chroma component. The first set of history intra coding information is used for intra-mode coding the luma component. In some embodiments, a second set of history intra coding information is used for intra-mode coding the chroma component. In some embodiments, the luma component is based on a first coding tree and the chroma component is based on a second coding tree different from the first coding tree.

In some embodiments, selecting the first intra prediction mode is further based on intra prediction modes of spatial neighbors of the current block or intra prediction modes of non-adjacent neighbors of the current block. In some embodiments, the history intra coding information is stored in a table.

Figure 20:
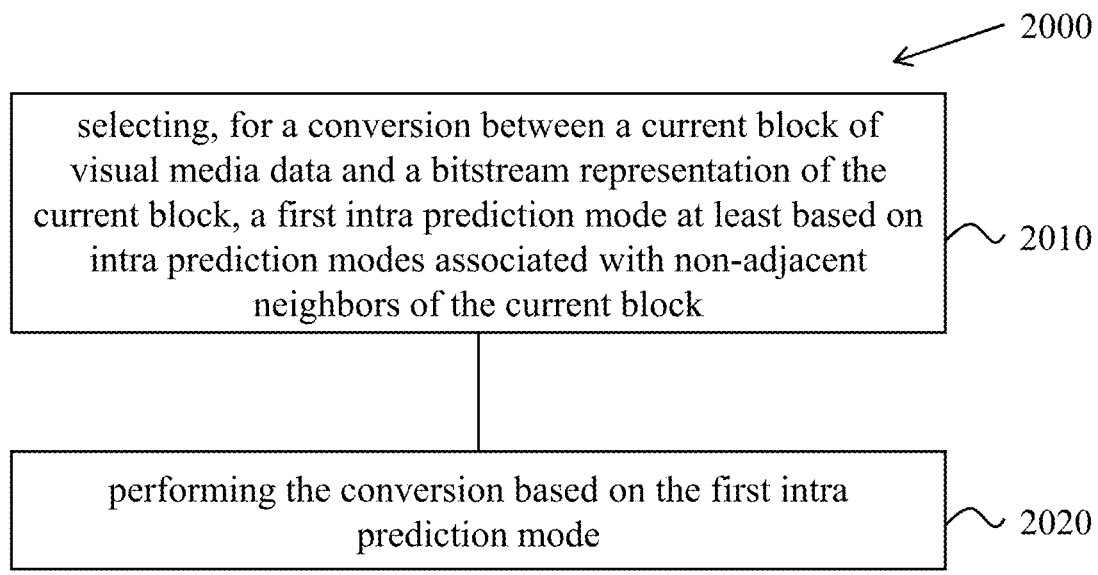
FIG. 20 shows a flowchart of another example method for video processing in accordance with the disclosed technology.

FIG. 20 shows a flowchart of another example method 2000 for video processing in accordance with the disclosed technology. The method 2000 includes, at operation 2010, selecting, for a conversion between a current block of visual media data and a bitstream representation of the current block, a first intra prediction mode based on at least intra prediction modes associated with non-adjacent neighbors of the current block. The method 2000 also includes, at operation 2020, performing the conversion based on the first intra prediction mode.

In some embodiments, the conversion includes encoding the current block to generate the bitstream representation. In some embodiments, the conversion includes decoding the bitstream representation to generate the current block.

In some embodiments, the method further includes constructing, for the conversion between the current block and the bitstream representation of the current block, a most probable mode (MPM) list based on the intra prediction modes associated with the non-adjacent neighbors of the current block. The conversion is performed further based on the MPM list. In some embodiments, constructing the MPM list includes adding intra prediction modes associated with spatial neighbors of the current block to the MPM list and pruning the MPM list. In some embodiments, constructing the MPM list includes adding derived intra prediction modes to the MPM list. In some embodiments, the method includes increasing a size of the MPM list.

In some embodiments, the method includes reordering intra prediction modes that are not in the MPM list according to the intra prediction modes associated with the non-adjacent neighbors of the current block. In some embodiments, the intra prediction modes associated with the non-adjacent neighbors of the current block are associated with a higher priority for the reordering.

Figure 21:
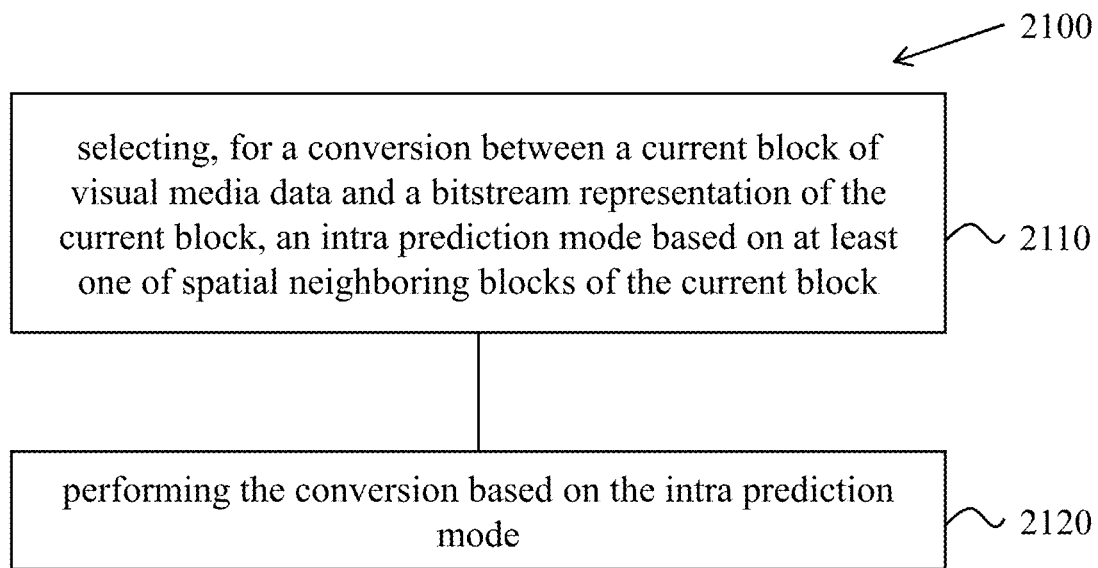
FIG. 21 shows a flowchart of another example method for video processing in accordance with the disclosed technology.

FIG. 21 shows a flowchart of an example method 2100 for video processing in accordance with the disclosed technology. The method 2100 includes, at operation 2110, selecting, for a conversion between a current block of visual media data and a bitstream representation of the current block, an intra prediction mode based on at least one of spatial neighboring blocks of the current block. The at least one of the spatial neighboring blocks is different from a first block that is located to a left of a first row of the current block and a second block that is located above a first column of the current block. The method 2100 also includes, at operation 2110, performing the conversion based on the intra prediction mode.

In some embodiments, the conversion comprises encoding the current block to generate the bitstream representation. In some embodiments, the conversion comprises decoding the bitstream representation to generate the current block.

In some embodiments, the at least one of the spatial neighboring blocks includes a block adjacent to the current block. In some embodiments, the at least one of the spatial neighboring blocks includes a block non-adjacent to the current block. In some embodiments, the at least one of the adjacent spatial neighboring blocks includes a block adjacent to a top-left position of the current block. In some embodiments, the at least one of the adjacent spatial neighboring blocks includes a block adjacent to a center position of a first row of the current block. In some embodiments, the at least one of the adjacent spatial neighboring blocks includes a block adjacent to a center position of a first column of the current block.

In some embodiments, the at least one of the spatial neighboring blocks is selected based on one or more dimensions of the current block. In some embodiments, the current block has a square shape, and the at least one of the adjacent spatial neighboring blocks includes a block adjacent to a top-left position of the current block. The selected intra prediction mode can be added to a most-probable-mode list of the current block.

In some embodiments, the current block has a non-square shape, and the at least one of the spatial neighboring blocks includes a block adjacent to a center position of a first row of the current block or a block adjacent to a center position of a first column of the current block.

Figure 22:
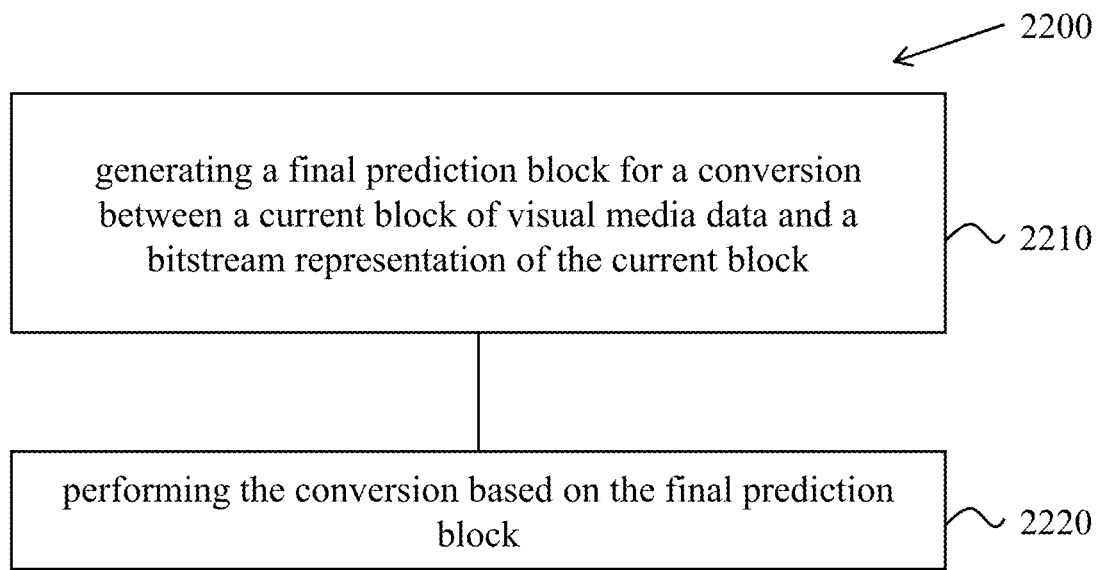
FIG. 22 shows a flowchart of another example method for video processing in accordance with the disclosed technology.

FIG. 22 shows a flowchart of an example method 2200 for video processing in accordance with the disclosed technology. The method 2200 includes, at operation 2210, generating a final prediction block for a conversion between a current block of visual media data and a bitstream representation of the current block. The method 2200 includes, at operation 2220, performing the conversion based on the final prediction block. At least a portion of the final prediction block is generated based on a combination of a first prediction block and a second prediction block that are based on reconstructed samples from an image segment that comprises the current block. In some embodiments, the conversion comprises encoding the current block to generate the bitstream representation. In some embodiments, the conversion comprises decoding the bitstream representation to generate the current block.

In some embodiments, the first prediction block is generated according to an intra prediction mode. In some embodiments, the second prediction block is generated based on a motion vector pointing to the image segment. In some embodiments, the second prediction block is generated based on an intra block copy technology in which the reconstructed samples pointed by the motion vector are copied. In some embodiments, the second prediction block is generated based on an intra block copy technology in which motion compensation is applied to the reconstructed samples pointed by the motion vector before applying an in-loop filtering operation.

In some embodiments, the reconstructed samples are generated before an in-loop filtering operation is applied. In some embodiments, a remaining portion of the final prediction block is copied directly from the first or second prediction block. In some embodiments, the combination of the first and the second prediction blocks comprises a linear function of the first and second prediction blocks. In some embodiments, the linear function comprises an average of the first and second prediction blocks. In some embodiments, the linear function includes a weighted linear function of the first and the second prediction blocks. In some embodiments, different weights are applied for different positions relative to the first or the second prediction block. In some embodiments, different weights are applied for different intra prediction modes. In some embodiments, weights of the weighted linear function are signaled in a sequence parameter set (SPS), a picture parameter set (PPS), a video parameter set (VPS), a slice header, a tile header, a group of coding tree units (CTUs), a coding unit (CU), a prediction unit (PU) or a transform unit (TU). In some embodiments, weights of the weighted linear function are predefined.

In some embodiments, the image segment includes a picture, a slice or a tile. In some embodiments, the first prediction block and the second prediction block are generated for a selected color component of the current block. In some embodiments, the selected color component includes a luma color component. In some embodiments, the first prediction block and the second prediction block are generated upon determining that a size or a shape of the current block satisfies a predefined criterion.

Figure 23:
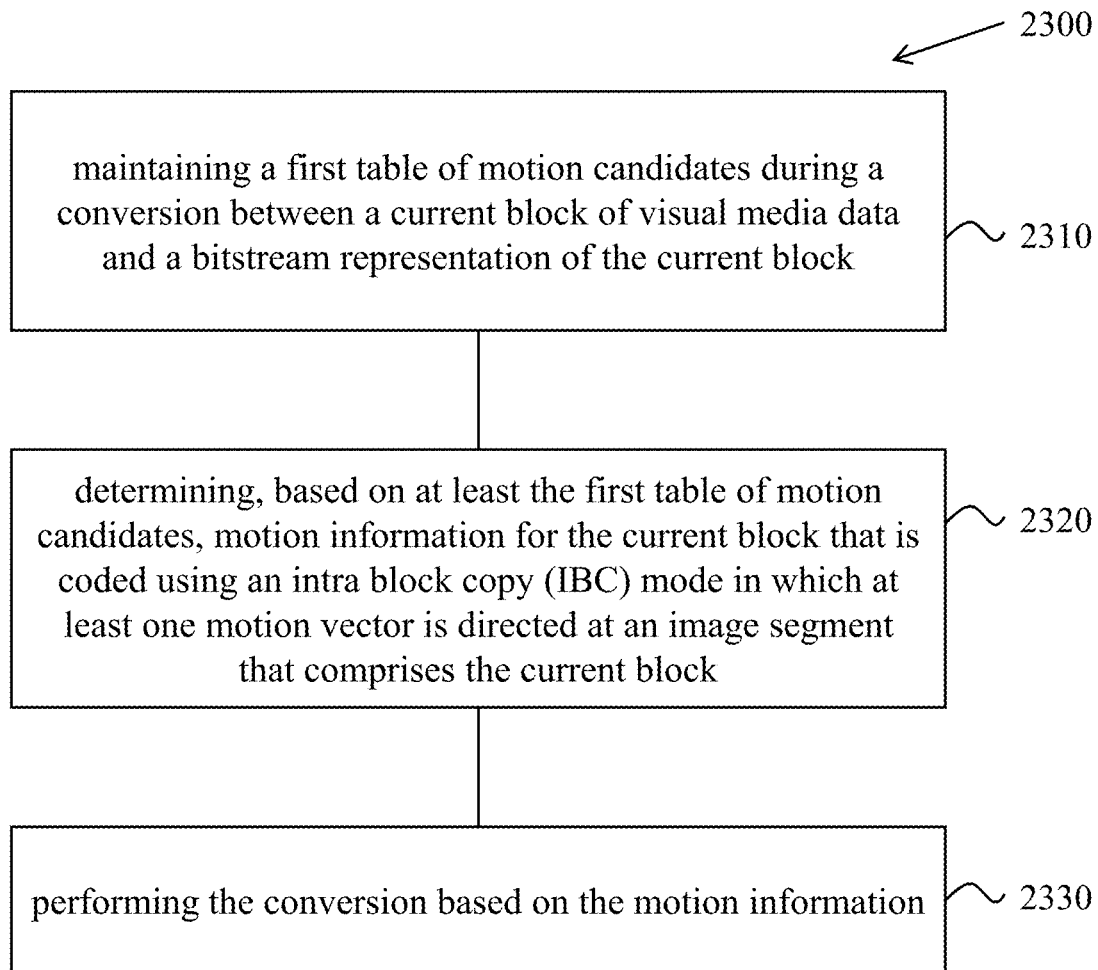
FIG. 23 shows a flowchart of another example method for video processing in accordance with the disclosed technology.

FIG. 23 shows a flowchart of an example method 2300 for video processing in accordance with the disclosed technology. The method 2300 includes, at operation 2310, maintaining a first table of motion candidates during a conversion between a current block of visual media data and a bitstream representation of the current block. The method 2300 includes, at operation 2320, determining, based on at least the first table of motion candidates, motion information for the current block that is coded using an intra block copy (IBC) mode in which at least one motion vector is directed at an image segment that comprises the current block. The method 2300 also includes, at operation 2330, performing the conversion based on the motion information. In some embodiments, the conversion includes encoding the current block to generate the bitstream representation. In some embodiments, the conversion includes decoding the bitstream representation to generate the current block.

In some embodiments, the method includes selectively updating, based on a rule, the first table of motion candidates using the motion information for the conversion. In some embodiments, the rule specifies adding the motion information to the first table of motion candidates. In some embodiments, the rule specifies excluding the motion information from the first table of motion candidates.

In some embodiments, the method includes updating, based on the motion information for the current block, the first table of motion candidates after the conversion. In some embodiments, the method includes performing a second conversion between a second block of visual media data and the bitstream representation of the second block using the updated first table of motion candidates. The second block can be coded using the intra block copy mode. In some embodiments, the first table of motion candidates includes only motion information from blocks that are coded using the intra block copy mode. In some embodiments, the first table of motion candidates is only used for processing blocks that are coded using the intra block copy mode. In some embodiments, the first table of motion candidates includes motion information from blocks that are coded using the intra block copy mode and excludes motion information from blocks that are coded using other techniques. In some embodiments, the first table of motion candidates includes motion information from blocks that are coded using the intra block copy mode and motion information from blocks that are coded using other techniques. In some embodiments, the second conversion is performed using motion candidates associated with IBC coded blocks in the updated first table of motion candidates.

In some embodiments, the method includes maintaining, for a third conversion between a third block of visual media data and the bitstream representation of the third block, a second table of motion candidates, performing the third conversion between the third block and the bitstream representation of the third block based on the second table of motion candidates. In some embodiments, the third conversion is performed without using the updated first table of motion candidates. In some embodiments, the second table includes motion information from blocks that are encoded using other techniques that are different than the IBC mode. In some embodiments, the third block is coded using a technique that is different than the IBC mode. In some embodiments, the technique includes an inter mode. In some embodiments, the method includes updating the second table of motion candidates using motion information for the third conversion. In some embodiments, the method includes performing a fourth conversion between an IBC coded block based on the updated first table and performing a fifth conversion between an inter coded block based on the updated second table.

In some embodiments, the method includes comparing a motion candidate associated with the current block with a number of entries in the first table. The first table is updated based on the comparing. In some embodiments, the number of entries corresponds to all entries in the first tables. In some embodiments, the number of entries is m, m being an integer, and the m entries are last m entries in the first table. In some embodiments, updating the first table comprises adding the motion candidate to the first table. In some embodiments, the first table includes no duplicated entries.

In some embodiments, the method includes determining that the current block is further coded using an IBC merge mode or an IBC Advanced Motion Vector Prediction (AMVP) mode. In some embodiments, the method includes determining a list of motion candidates for the current block by combining the first table of motion candidates and a set of adjacent or non-adjacent candidates of the current block and performing the conversion based on the list. In some embodiments, the combining comprises checking m candidates from the set of adjacent or non-adjacent candidates, and checking n motion candidates from the first table of motion candidates, wherein m and n are positive integers. In some embodiments, the method includes adding at least one of the m candidates from the set of adjacent or non-adjacent candidates to the list of motion candidates upon determining that the list is not full. In some embodiments, the method includes adding at least one of the n motion candidates from the first table of motion candidates to the list of motion candidates upon determining that the list is not full.

In some embodiments, the combining comprises checking candidates from the set of adjacent or non-adjacent candidates and the first table of motion candidates in an interleaved manner. In some embodiments, the method includes checking a candidate from the set of adjacent or non-adjacent candidates prior to checking a motion candidate from the first table. In some embodiments, the checking comprises checking a candidate from the set of adjacent or non-adjacent candidates and replacing, based on a coding characteristic of an adjacent or non-adjacent block associated with the adjacent or non-adjacent candidate, the candidate with a motion candidate from the first table of motion candidates. In some embodiments, the coding characteristic of the adjacent or non-adjacent block indicates that the adjacent or non-adjacent block is located outside a pre-defined range. In some embodiments, the coding characteristic of the adjacent or non-adjacent block indicates that the adjacent or non-adjacent block is intra coded. In some embodiments, adding a motion candidate further comprising adding the motion candidate to the list upon determining that the motion candidate from the first table of motion candidates is different from at least one candidate from the set of adjacent or non-adjacent candidates. In some embodiments, the set of adjacent or non-adjacent candidate has a higher priority than the first table of motion candidates.

In some embodiments, the list of motion candidates comprises multiple merge candidates used for IBC merge-coded blocks. In some embodiments, the list of motion candidates comprises multiple AMVP candidates used for IBC AMVP-coded blocks. In some embodiments, the list of motion candidates comprises intra prediction modes used for intra-coded blocks. In some embodiments, a size of the first table is pre-defined or signaled in the bitstream representation. In some embodiments, the first table is associated with a counter that indicates a number of available motion candidates in the first table.

In some embodiments, the method includes resetting the first table before processing a new slice, a new LCU row, or a new tile. In some embodiments, the counter is set to zero before processing a new slice, a new LCU row, or a new tile.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered example only. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for video processing, comprising: generating a final prediction block for a conversion between a current block of a video
and a bitstream of the video; and
performing the conversion based on the final prediction block,
wherein a portion of the final prediction block is generated by a combination of a first
prediction block and a second prediction block that are based on reconstructed samples that are only from an image segment that comprises the current block, and a remaining portion of the final prediction block is copied directly from the first or second prediction block,
wherein the first prediction block is generated according to an intra prediction mode,
wherein the second prediction block is generated by adding motion compensation to at
least part of the reconstructed samples pointed by a block vector before applying an in-loop filtering operation;

wherein the first prediction block and the second prediction block are generated upon
determining that a size or a shape of the current block satisfies a predefined criterion;
wherein the block vector points to samples in the image segment that comprises the current block.

2. The method of claim 1, wherein the conversion includes encoding the current block into the bitstream.

3. The method of claim 1, wherein the conversion includes decoding the current block from the bitstream.

4. The method of claim 1, wherein the reconstructed samples pointed by the block vector are copied.

5. The method of claim 1, wherein:
the reconstructed samples are generated before the in-loop filtering operation is applied.

6. The method of claim 1, wherein the combination of the first and the second prediction blocks comprises a linear function of the first and second prediction blocks, wherein the linear function comprises an average of the first and second prediction blocks or a weighted linear function of the first and the second prediction blocks.

7. The method of claim 6, wherein different weights are applied for different positions relative to the first or the second prediction block.

8. The method of claim 7, wherein different weights are applied for different intra prediction modes.

9. The method of claim 1, wherein the image segment includes a picture, a slice or a tile.

10. The method of claim 1, wherein the first prediction block and the second prediction block are generated for a selected color component of the current block.

11. The method of claim 10, wherein the selected color component includes a luma color component.

12. An apparatus for video processing, comprising a processor and a non-transitory memory with instructions thereon, wherein the instructions upon execution by the processor, cause the processor to:
generate a final prediction block for a conversion between a current block of a video and
a bitstream of the video; and
perform the conversion based on the final prediction block,
wherein a portion of the final prediction block is generated by a combination of a first
prediction block and a second prediction block that are based on reconstructed samples that are only from an image segment that comprises the current block, and a remaining portion of the final prediction block is copied directly from the first or second prediction block,
wherein the first prediction block is generated according to an intra prediction mode,
wherein the second prediction block is generated by adding motion compensation to at
least part of the reconstructed samples pointed by a block vector before applying an in-loop filtering operation;
wherein the first prediction block and the second prediction block are generated upon
determining that a size or a shape of the current block satisfies a predefined criterion;
wherein the block vector points to samples in the image segment that comprises the current block.

13. The apparatus of claim 12, wherein the reconstructed samples pointed by the block vector are copied.

14. The apparatus of claim 12, wherein the combination of the first and the second prediction blocks comprises a linear function of the first and second prediction blocks, wherein the linear function comprises a weighted linear function of the first and the second prediction blocks.

15. The apparatus of claim 14, wherein different weights are applied for different positions relative to the first or the second prediction block.

16. A non-transitory computer-readable recording medium storing a bitstream of a video which is generated by a method performed by a video processing apparatus, wherein the method comprises:
generating a final prediction block for a conversion between a current block of the video
and the bitstream of the video; and generating the bitstream based on the final prediction block, wherein a portion of the final prediction block is generated by combining a first prediction block and a second prediction block that are based on reconstructed samples that are
only from an image segment that comprises the current block, and a remaining portion of the final prediction block is copied directly from the first or second prediction block,
wherein the first prediction block is generated according to an intra prediction mode,
wherein the second prediction block is generated by adding motion compensation to at
least part of the reconstructed samples pointed by a block vector before applying an in-loop filtering operation;
wherein the first prediction block and the second prediction block are generated upon
determining that a size or a shape of the current block satisfies a predefined criterion;
wherein the block vector points to samples in the image segment that comprises the current block.

17. The apparatus of claim 12, wherein the conversion includes encoding the current block into the bitstream.

18. The apparatus of claim 12, wherein the conversion includes decoding the current block from the bitstream.

19. The non-transitory computer-readable recording medium of claim 16, wherein the reconstructed samples pointed by the block vector are copied.

20. The non-transitory computer-readable recording medium of claim 16, wherein the combination of the first and the second prediction blocks comprises a linear function of the first and second prediction blocks, wherein the linear function comprises a weighted linear function of the first and the second prediction blocks.

* * * * *